(12) United States Patent
O'Shea

(10) Patent No.: US 10,572,830 B2
(45) Date of Patent: Feb. 25, 2020

(54) LEARNING AND DEPLOYING COMPRESSION OF RADIO SIGNALS

(71) Applicant: Virginia Tech Intellectual Properties, Inc., Blacksburg, VA (US)

(72) Inventor: Timothy James O'Shea, Arlington, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 0 days.

(21) Appl. No.: 15/961,454

(22) Filed: Apr. 24, 2018

(65) Prior Publication Data

US 2018/0314985 A1 Nov. 1, 2018

Related U.S. Application Data

(60) Provisional application No. 62/489,057, filed on Apr. 24, 2017, provisional application No. 62/489,055, filed on Apr. 24, 2017, provisional application No. 62/500,621, filed on May 3, 2017.

(51) Int. Cl.
| | |
|---|---|
| *G06N 99/00* | (2019.01) |
| *G06N 3/08* | (2006.01) |
| *G06N 20/00* | (2019.01) |
| *H04W 24/08* | (2009.01) |

(52) U.S. Cl.
CPC .............. *G06N 20/00* (2019.01); *G06N 3/08* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 5,386,199 A | * | 1/1995 | Yeom | H03G 7/08 327/306 |
| 2018/0176232 A1 | * | 6/2018 | Rodriguez | H04L 63/145 |

OTHER PUBLICATIONS

Baldi et al. "Complex-Valued Autoencoders", Neural Network (preprint), 2014, pp. 35.*
Migliori et al. (Biologically Inspired Radio Signal Feature Extraction with Sparse Denoising Autoencoders, 2016, pp. 12, https://arxiv.org/pdf/1605.05239.pdf.*

(Continued)

*Primary Examiner* — Li Wu Chang
(74) *Attorney, Agent, or Firm* — Fish & Richardson P.C.

(57) ABSTRACT

Methods, systems, and apparatus, including computer programs encoded on computer storage media, for training and deploying machine-learned compact representations of radio frequency (RF) signals. One of the methods includes: determining a first RF signal to be compressed; using an encoder machine-learning network to process the first RF signal and generate a compressed signal; calculating a measure of compression in the compressed signal; using a decoder machine-learning network to process the compressed signal and generate a second RF signal that represents a reconstruction of the first RF signal; calculating a measure of distance between the second RF signal and the first RF signal; and updating at least one of the encoder machine-learning network or the decoder machine-learning network based on (i) the measure of distance between the second RF signal and the first RF signal, and (ii) the measure of compression in the compressed signal.

32 Claims, 13 Drawing Sheets

(56) References Cited

OTHER PUBLICATIONS

Elvino S. Sousa, et al., "Pulse Shape Design for Teletext Data Transmission", IEEE Transactions on Communications, vol. Com-31, No. 7, Jul. 1983, pp. 871-878.
Geoffrey E. Hinton, et al., "Autoencoders, Minimum Description Length and Helmholtz Free Energy", Mar. 1, 2001, pp. 1-9.
Honglak Lee, et al., "Efficient Sparse Coding Algorithms", Computer Science Department, Stanford University, 8 pages.
Charles Clancy, et al., "Applications of Machine Learning to Cognitive Radio Networks", Cognitive Wireless Networks, IEEE Wireless Communications , Aug. 2007, pp. 47-52.
Pascal Vincent, et al., "Extracting and Composing Robust Features with Denoising Autoencoders", Universite de Montreal, Dept. IRO, CP 6128, Succ. Centre-Ville, Montral, Qubec, H3C 3J7, Canada, pp. 1-8.
Jonathan Masci, et al., "Stacked Convolutional Auto-Encoders for Hierarchical Feature Extraction", pp. 52-59.
Nitish Srivastava, et al., "Dropout: A Simple Way to Prevent Neural Networks from Overtting", Journal of Machine Learning Research 15 (2014) 1929-1958; Submitted Nov. 2013; Published Jun. 2014, pp. 1929-1958.
Diederik P.Kingma, et al., "Adam: A Method for Stochastic Optimization", Published as a conference paper at ICLR 2015, pp. 1-15.
Timothy J. O'Shea, et al., "Convolutional Radio Modulation Recognition Networks", Springer International Publishing Switzerland 2016, EANN 2016, CCIS 629, pp. 213-226, 2016.

\* cited by examiner

LEARNING AND DEPLOYING COMPRESSION OF RADIO SIGNALS

CROSS-REFERENCE TO RELATED APPLICATION

This application claims priority to U.S. Provisional Application Nos. 62/489,057 and 62/489,055 both filed on Apr. 24, 2017, and 62/500,621 filed on May 3, 2017. The disclosures of these prior applications are considered part of and are incorporated by reference in the disclosure of this application.

TECHNICAL FIELD

The present disclosure relates to machine learning and deployment of compact representations of radio frequency (RF) signals.

BACKGROUND

Radio frequency (RF) waveforms are prevalent in many systems for communication, storage, sensing, measurements, and monitoring. RF waveforms are transmitted and received through various types of communication media, such as over the air, under water, or through outer space. In some scenarios, RF waveforms transmit information that is modulated onto one or more carrier waveforms operating at RF frequencies. In other scenarios, RF waveforms are themselves information, such as outputs of sensors or probes. Information that is carried in RF waveforms is typically processed, stored, and/or transported through other forms of communication, such as through an internal system bus in a computer or through local or wide-area networks.

SUMMARY

In general, the subject matter described in this disclosure can be embodied in methods, apparatuses, and systems for training and deploying machine-learning networks to learn compact representations of radio frequency (RF) signals.

In one aspect, a method is performed by at least one processor to train at least one machine-learning network to learn compact representations of radio frequency (RF) signals. The method includes: determining a first RF signal to be compressed; using an encoder machine-learning network to process the first RF signal and generate a compressed signal; calculating a measure of compression in the compressed signal; using a decoder machine-learning network to process the compressed signal and generate a second RF signal that represents a reconstruction of the first RF signal; calculating a measure of distance between the second RF signal and the first RF signal; and updating at least one of the encoder machine-learning network or the decoder machine-learning network based on (i) the measure of distance between the second RF signal and the first RF signal, and (ii) the measure of compression in the compressed signal.

In another aspect, a method is performed by at least one processor to deploy at least one machine-learning network that has been trained to learn compact representations of radio frequency (RF) signals. The method includes: determining an encoder machine-learning network and a decoder machine-learning network that have been trained to learn compact representations of RF signals; determining a first RF signal to be compressed; using the encoder machine-learning network to process the first RF signal and generate a first compressed signal; obtaining a second compressed signal that comprises the first compressed signal or an alteration thereof; and using the decoder machine-learning network to process the second compressed signal to generate a second RF signal as a reconstruction of the first RF signal.

Other implementations of this and other aspects include corresponding systems, apparatuses, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

All or part of the features described throughout this application can be implemented as a computer program product including instructions that are stored on one or more non-transitory machine-readable storage media, and that are executable on one or more processing devices. All or part of the features described throughout this application can be implemented as an apparatus, method, or electronic system that can include one or more processing devices and memory to store executable instructions to implement the stated functions.

The details of one or more implementations of the subject matter of this disclosure are set forth in the accompanying drawings and the description below. Other features, aspects, and advantages of the subject matter will become apparent from the description, the drawings, and the claims.

DETAILED DESCRIPTION

Figure 1:
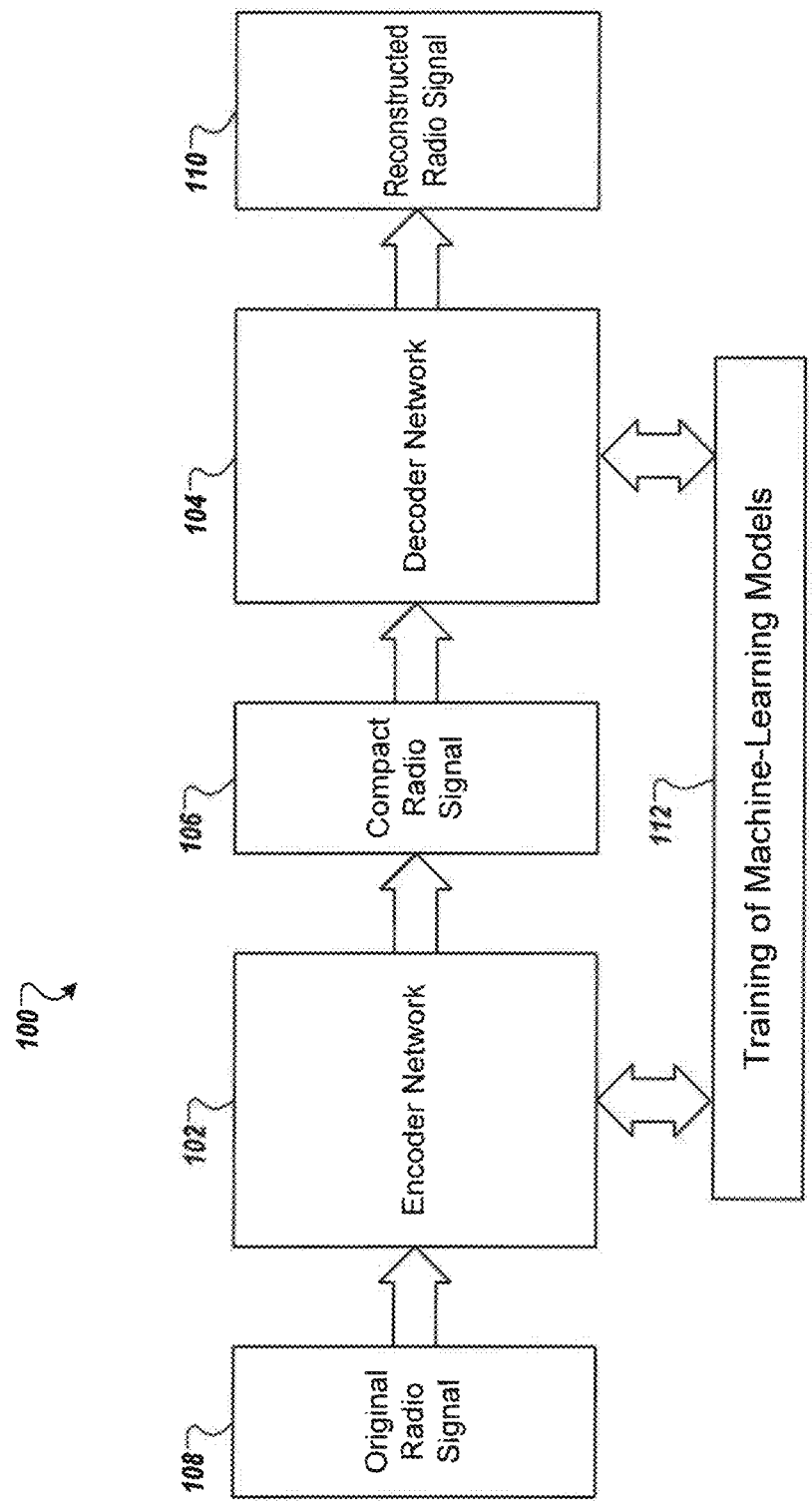
FIG. 1 illustrates an example of a radio frequency (RF) system that implements machine-learning encoder and decoder networks to perform learned compression and decompression of RF signals.

Systems and techniques are disclosed herein that enable machine learning and deployment of compact representations of radio frequency (RF) signals. Such systems and techniques are able to learn new representations and structures for RF signals, and learn compression schemes matched to certain signal types and encodings. In some scenarios, even without or with minimal specific design information about the types of signals, systems and techniques disclosed herein provide a structured description of how RF signals are composed, and may help provide information regarding the types of signals, similarity between different signals, and how signals were constructed by unknown radio transmitter devices.

The RF signals may themselves be information, such as measurements that are output from sensors or probes, including medical devices and equipment monitoring devices. Alternatively, the RF signals may be fixed waveforms that have been modulated to carry other information, such as carrier waveforms modulated by a communication system to carry data. In both scenarios, implementations disclosed herein enable learning compact representations of RF signals, and provide efficient representation, transport, storage, analysis, and high-level understanding of those signals.

The disclosed implementations provide a novel capability for representing and compressing radio signals. By learning compact representations of RF signals, various types of radio signals may be stored more compactly and reconstructed more efficiently and effectively, providing a smaller compressed signal size and lower computational complexity for compression compared to existing techniques.

Techniques disclosed herein may be applied to various scenarios in the field of digital radio signal processing. For example, in RF communication systems, a radio head typically transmits or receives wireless radio signals over a medium, such as over the air. These radio heads typically communicate, via a communication bus (e.g., using CPRI or VITA-49), with underlying baseband processing devices, which encode or decode the transmitted or received radio signals to concise protocol information. The cost of the communication bus between a radio head and an underlying baseband processing device is directly related to the bandwidth that the communication bus is configured to carry. In addition, there is a direct relationship between the number of radio heads that may be supported on a single bus and the compression rate at which their signals may be transmitted over the bus. By learning a compact representations of such radio signals, implementations disclosed herein provide an improved compression rate of information onto the bus, and provide support for more radio heads by the bus, cheaper communication buses running at lower rates, and generally make the transport of digital radio data cheaper and more attractive due to the ability to support more antennas/heads and higher data rates with the same backhaul equipment. As an example scenario, this may be especially important for wireless systems such as massive MIMO where the number of antennas, and therefore number of sample information streams, is high and the potential for compression due to correlated antenna contents is also very high.

As another example, in digital radio signal storage, instead of transmission between a radio head and a baseband processing device, a radio head or other radio receiver that includes an analog to digital (A/D) converter may store the radio information in a storage device, such as a magnetic storage device or solid state memory (e.g., NAND or NOR flash memory). Parts of the stored radio signal may later be reconstructed, for example during a baseband processing or analysis process. In this case, the rate at which the radio signal can be written to memory (e.g., in terms of samples per second), as well as the length of time (e.g., in total seconds) that can be recorded contiguously, are both limiting factors that constrain the effectiveness of storage and representation of radio signals. By learning compact representations of such radio signals, implementations disclosed herein provide improved storage of radio signals that is faster and that supports longer contiguous intervals, and enables the use of fewer effective bits to store each sample of radio signal for effective reconstruction of the signal with minimal distortion. Such techniques also enable storage of information corresponding to a larger number of antennas within a constrained or fixed amount of storage throughput or disk space.

Existing forms of compression typically decouple the compression of data from the waveform representations of that data. For example, a common technique is to sample and quantize analog waveforms into a digital representation, convert the digital representation into bits, and apply compression techniques to reduce the number of bits used for storage or transmission. By contrast, implementations disclosed herein enable learning compact representations of RF signals without necessarily being restricted to a particular analog-to-digital conversion or modulation technique. As such, regardless of how an RF signal was generated or what type of information it carries, implementations disclosed herein provide a broadly applicable technique for learning compact representations of the RF signal that enable improved compression for transmission or storage. Depending on the configuration of the training system and data sets used, compression techniques can specialize in performance in compressing a narrow class of signal types, or may generalize and optimize performance in compressing a wide range of signal types or mixtures of one or more signals.

FIG. 1 illustrates an example of a radio frequency (RF) system 100 that implements machine-learning encoder and decoder networks to perform learned compression and decompression of RF signals. In this example, the system 100 includes both an encoder network 102 and a decoder network 104 that each implement machine-learning networks.

The machine-learning models in the encoder 102 and decoder 104 are trained to learn compact representations 106 for a training data set of RF signals 108. During this training 112, the encoder network 102 learns how to compress an RF signal 108 into a compact representation 106, and the decoder network 104 learns how to decompress a compact representation 106 into a reconstructed RF signal 110 that approximates the original RF signal 108. The encoder 102 and decoder 104 may be trained to achieve various types of objective functions, such as a measure of compression, a measure of reconstruction error, a measure of computational complexity, or combinations thereof. Further details of training are described below, for example with reference to FIG. 3.

In some implementations, the encoder or decoder employs one or more signal processing operations, which are suited to the signal type of signal domain that may assist in learning. As examples, the encoder and/or decoder may implement one or more pre-processing stages, such level normalization, synchronization, expert signal representations and/or basis functions, or other signal processing methods that may be suitable for a particular type of signal or signal domain.

Once trained, the machine-learning encoder 102 and decoder 104 may be deployed in various application scenarios to perform compression and decompression of RF signals, using the compact representations that were learned during training. For example, the trained encoder network 102 and decoder network 104 may utilize a learned compact representation 106 to perform transmission of RF information over a communication medium, storage of RF information in a memory device, or detection of specific errors, anomalies, events of interest, or other changes occurring in the RF information. In some implementations, the encoder 102 and/or decoder 104 may be further updated during deployment based on real-time performance results of compression and decompression and/or based on feedback of other system performance metrics (e.g., bit error rate, classification rate, detection rate, etc.). Further details of deployment are described below, for example with reference to FIG. 7. In some instances, anomalies can be detected by analyzing the distance metric between the input and reconstructed signal, for example by detecting the distance increasing unexpectedly, which may occur because the system has not been trained on the anomalous data (and it therefore does not well match the set of basis functions the encoding has been optimized for).

In some implementations, the input radio signal 108 may represent the result of an analog RF waveform that was received by one or more antennas over a medium, such as over the air. The radio signal 108 may be processed by the encoder network 102 in analog or digital form. For example, the radio signal 108 may represent a digitized representation, such as a raw sampled time series, of an RF waveform that was received and processed by a receiver before being input into the encoder network 102. In some implementations, the radio signal 108 may be an analog waveform, and the encoder network 102 may implement various filters, samplers, analog-to-digital (A/D) converters, or other circuitry and modules for processing the radio signal 108.

The compact representation 106 may, in scenarios of deployment, be transmitted or stored in a communication medium or memory device, and subsequently processed by a decoder network 104. Alternatively, in other scenarios of deployment or in scenarios of training, the compact representation 106 may be directly processed by the decoder network 104, to compare the reconstructed radio signal 110 with the original radio signal 108.

In some instances, the compact representation 106 may be used as an input to an additional machine learning model or other system, examples of which are discussed in regards to FIG. 12, below. In such instances, the compact representation may present a more compact and concise representation of one or more radio signals, whereby a downstream system, for instance an anomaly detector, sequence modeler, learned transceiver, and/or predictor, may achieve lower complexity and/or better performance by operating on a compressed form of the signal.

The decoder network 104 may implement a machine-learning model to generate a reconstructed radio signal 110 based on the compact representation 106, or based on received/retrieved version thereof. As with the input radio signal 108, the reconstructed radio signal 110 may be in analog or digital form. For example, the reconstructed radio signal 110 may be in a sampled time series format, at the same or different sampling rate as the input signal 108. In some implementations, the reconstructed radio signal 110 may be in analog form, and the decoder network 104 may implement various filters, modulators, digital-to-analog (A/D) converters, or other circuitry and modules for generating the reconstructed radio signal 110.

In scenarios of training, the reconstructed radio signal 110 may be compared with the original radio signal 108, and the encoder network 102 and/or the decoder network 104 may be trained (updated) based on results of the reconstruction. The updating may be performed based on various criteria, such as a reconstruction error between the two signals 108 and 110. In some implementations, updating the networks 102 and/or 104 may be also based on other factors, such as computational complexity of the machine-learning networks (which can be measured, for example, by the number of parameters, number of multiplies/adds, execution time, Kolmogorov complexity, or otherwise), a measure of compression in the compact representation 106, or various combinations of these and other metrics.

In some implementations, the encoder network 102 and the decoder network 104 may include artificial neural networks that consist of one or more connected layers of parametric multiplications, additions, and non-linearities. In such scenarios, updating the encoder network 102 and/or decoder network 104 may include updating weights of the neural network layers, or updating connectivity in the neural network layers, or other modifications of the neural network architecture, so as to modify a mapping of inputs to outputs.

The encoder network 102 and the decoder network 104 may be configured to compress and decompress using any suitable machine-learning technique. For example, the encoder network 102 may be configured to learn a mapping from RF signal inputs 108 into a lower-dimension sparse as the compact representation 106. The decoder network 104 may be configured to learn a reverse mapping from the lower-dimension compact representation 106 into a higher-dimension signal that represents the reconstructed signal 110.

As an example, the mappings that are implemented in the encoder 102 and decoder 104 may involve learning a set of basis functions for radio signals. For a particular set of basis functions, the encoder 102 transforms the input signal 108 into a lower-dimensional projection of the signal 108 onto those basis functions. Correspondingly, the decoder 104 generates the reconstructed signal 110 by taking linear combinations of the basis functions according to the same lower-dimensional projections. The basis functions themselves may be any suitable orthogonal or non-orthogonal set of basis functions, subject to appropriate constraints on energy, amplitude, bandwidth, or other conditions.

RF signals that are processed by system 100 may include any suitable radio-frequency signal, such as acoustic signals, optical signals, or other analog waveforms, typically of human-designed communications system or radar/sonar system. The spectrum of RF signals that are processed by system 100 may be in a range of 1 kHz to 300 GHz. For example, such RF signals include very low frequency (VLF) RF signals between 1 kHz to 30 kHz, low frequency (LF) RF signals between 30 kHz to 300 kHz, medium frequency (MF) RF signals between 300 kHz to 1 MHz, high frequency (HF) RF signals between 1 MHz to 30 MHz, and higher-frequency RF signals up to 300 GHz.

Figure 2:
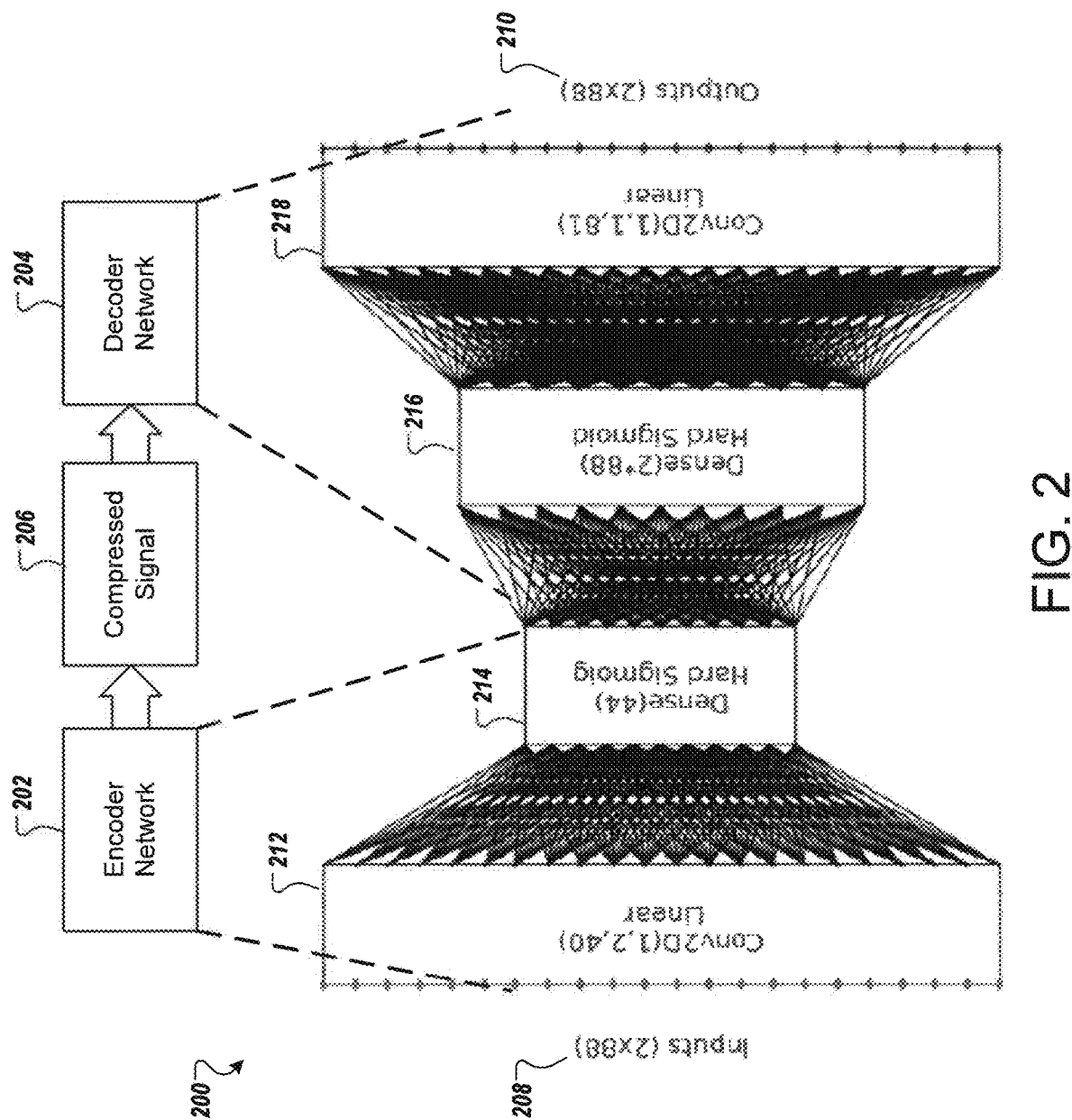
FIG. 2 illustrates an example of a structure of machine-learning encoder and decoder networks that may be implemented in an RF system to perform learned compression and decompression of RF signals.

FIG. 2 illustrates an example of a structure 200 of machine-learning encoder and decoder networks that may be implemented in an RF system to perform learned compression and decompression of RF signals. In general, the structure 200 uses a series of layers that form an encoder network 202 and a decoder network 204. The output of each layer is used as input to the next layer in the network. Each layer of the network generates an output from a received input in accordance with current values of a respective set of parameters to learn a compact representation 206.

The encoder network 202 and/or decoder network 204 may include one or more such series of layers that are shown in FIG. 2. For example, in some implementations, the encoder network 202 and/or decoder network 204 may include a plurality of networks that may be collectively or iteratively trained. As such, the network input 208 in FIG. 2 may be the original received RF signal (e.g., RF signal 108 in FIG. 1, above), or may be an output of a previous series of layers in the encoder network 204. Analogously, the network output 210 may represent the reconstructed signal (e.g., reconstructed signal 110 in FIG. 1, above), or may be an input into a subsequent series of layers in the decoder network 204.

In the example of FIG. 2, the encoder network 202 and decoder network 204 are implemented using a neural network structure 200 that is configured as an autoencoder. In the scenario of an autoencoder structure, the encoder and decoder are jointly trained to learn best approximations of input signals. In general, however, the network structure 200 may be configured as two separate networks, an encoder network 202 and a decoder network 204, that may be jointly or iteratively trained.

In general, the encoder network 202 may include one or more collections of multiplications, divisions, and summations of inputs and intermediate values, optionally followed by non-linearities (such as rectified linear units, sigmoid function, or otherwise) or other operations (e.g., normalization), which may be arranged in a feed-forward manner or in a manner with feedback and in-layer connections (e.g., a recurrent network). Parameters and weight values in the network may be used for a single multiplication, as in a fully connected neural network (DNN), or they may be "tied" or replicated across multiple locations within the network to form one or more receptive fields, such as in a convolutional neural network, a dilated convolutional neural network, a residual network unit, or similar. A collection of one or more of these layers may constitute both the encoder 202 and the decoder 204, as shown in the example of FIG. 2. The specific structure for the networks may be explicitly specified at design time, or may be selected from a plurality of possible architecture candidates to ascertain the best performing candidate.

The network structure 200 may implement a small number of dense and convolutional layers that are used with linear and/or hard sigmoid non-linear activations. In the example of FIG. 2, the structure 200 includes a first convolutional linear layer 212, a first dense hard sigmoid layer 214, second dense hard sigmoid layer 216, and a second convolutional linear layer 218. In general, however, implementations are not limited to these specific types of layers, and other configurations of layers and non-linearities may be used, such as rectified linear-unit (ReLU), sigmoid, tanh, and others. The network structure 200 uses these layers to predict an output 210 for a received input 208. Other architectures include fully connect (dense) networks with ReLU activations that are effective for many such compression tasks, as well as residual networks leveraging multiple normalized convolutional layers with bypass connections.

The convolutional weight configurations in the encoder 202 and decoder 204 stages may facilitate time-shift invariance learning, and may reduce the number of parameters used to fit the input 208. For example, by using convolutional layers with only one or two filters, implementations disclosed herein may achieve a maximally matched small set of time-basis filters. As such, convolutional layers may be well suited for reducing parameter space and forming a compact front-end for radio data. In some scenarios, learned weights and compressed representations can be extremely useful in the analysis or reception of unknown or partially known signal types. For example, filters can often learn the modulation basis functions or pulse shapes used within a transmission system very quickly which can be used to aid the reception or analysis of an unknown system type.

In addition to the convolutional layers, dense layers with non-linear activations may be implemented in between these convolutional layers to provide an estimation of the logic for what the representation and reconstruction should be for those basis filters occurring at different times.

A compact intermediate representation 206 is created by the encoder 202, which typically consists of a smaller number of activations than there were samples in the input 208 and lower precision (e.g., 1-bit, 2-bit, etc.). The input representation 208 may be a series of radio samples in time, frequency, or any other signal representation basis, with higher precision (e.g., 8, 10, 12, 16, or 32-bit integers, complex integers, floating-point values, or complex floating-point values). A complex baseband representation of in-phase and quadrature samples (I/Q) may also be used to represent the sampled time-series of a radio signal in this way. The reconstructed radio signal 210 is produced by the decoder 204 from the compact radio signal representation 206. This reconstructed signal 210 may be of comparable precision and number of samples to the input radio signal 208.

The network structure 200 may, in some implementations, include at least one regularization layer having at least one of weight regularization on convolutional network layer weights, activity regularization on dense network layer activations, or other stochastic impairments on activations or weights, such as dropout. For example, regularization may be used to prevent over-fitting. Dropout, such as a penalty on the convolutional layer weights, may be utilized to encourage minimum energy bases, and a penalty on the first dense layer activation may be utilized to encourage sparsity of solutions.

In some implementations, the network structure 200 may include a deep dense (e.g., fully connected) neural network (DNN) and/or a convolutional neural network (CNN). Either or both of the encoder neural network and/or the decoder neural network may be a recurrent or quasi-recurrent neural network, or some combination of these layers which may be sequential, parallel, or connected with various bypass or cross connections.

In some implementations, the network structure 200 may be implemented as a denoising autoencoder. By introducing noise into the input of the training or into intermediate layer representations, but evaluating its reconstruction of the unmodified input, denoising autoencoders can perform an additional input noise regularization effect which models additive Gaussian thermal noise that is prevalent in communications systems. In this way, the network can learn the structural components of a signal, removing certain stochastic effects such as noise from the reconstruction of the signal. This can be useful in removing or lowering the noise level present within a radio signal which may aide in the processing of the signal for other purposes.

A general design objective for the network structure 200 may be to obtain a minimum complexity network, while still achieving desired compression performance to reconstruct signals of interest with a significant amount of information compression. Certain realizations of the system may favor improved compression performance, other improved properties of the compressed signal representation, or improved computational complexity. As such, the system may evaluate a trade-off between these objectives, which may be used in order to help determine the specific architecture used for one signal encoder, decoding, or other signal inference task.

Figure 3:
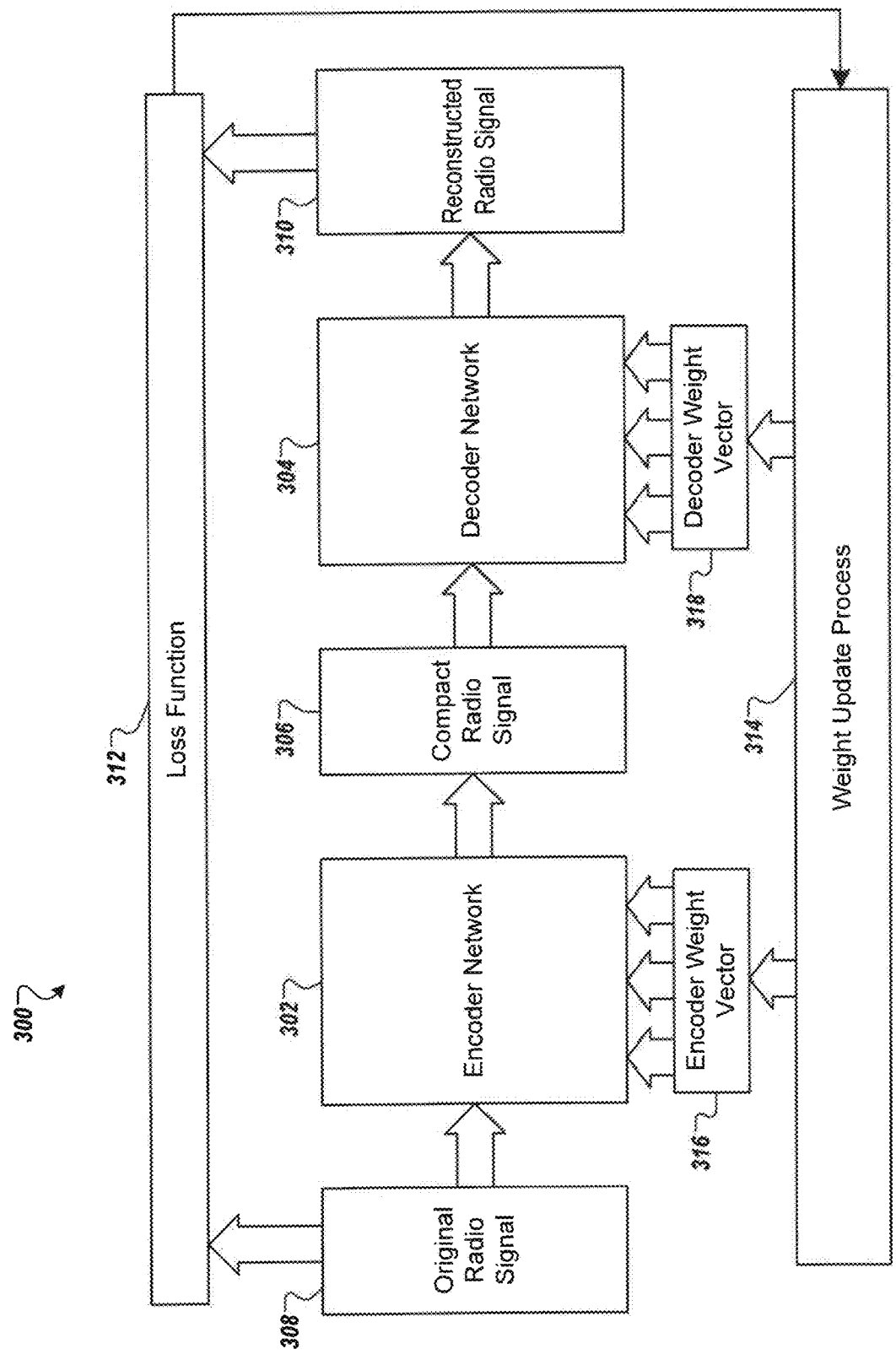
FIG. 3 illustrates an example of a training an RF system that implements machine-learning encoder and decoder networks to learn compact representations of RF signals.

FIG. 3 illustrates an example of a training an RF system 300 that implements machine-learning encoder and decoder networks to learn compact representations of RF signals. In this example, the system 300 includes an encoder network 302 and a decoder network 304 that are trained to learn a compact representation 306.

During training, the encoder network 302 and decoder network 304 may either be jointly trained or iteratively trained. For example, the encoder network 302 and the decoder network 304 may be jointly trained as an auto-encoder configured to generate a reconstructed signal 310 that best approximates the original signal 308, subject to constraints or other objectives. In some implementations, the encoder network 302 and decoder network 304 may be separately trained. In such scenarios, one of the networks may be fixed, either by previous training or by a compression/decompression scheme, while the other network is trained to learn a compact representation that is appropriate for the fixed counterpart network. For example, the encoder network 302 may be fixed, and the decoder network 304 may be trained to learn a mapping from the resulting compact representation 306 to a reconstructed signal 310 that is best suited for the fixed encoder 302. In some instances when training one of the encoder network 302 or decoder network 304 separately, data representing the intermediate or compressed representation may be used as an input or an output for the optimization process rather than the end-to-end optimization scheme.

The system 300 utilizes the encoder 302 and decoder 304 to compress radio signal data 308 into a compact representation 306, and to decompress into a reconstructed signal 310. The system 300 and then computes a loss function 312 between the original signal 308 and the reconstructed signal 310. The loss function 312 may be any suitable measure of distance between the two signals, such as cross-entropy, mean squared error, or other geometric distance metric (e.g., MAE) between the original RF signal 308 and the reconstructed RF signal 310. In some implementations, the loss function 312 may combine several geometric, entropy based, and/or other classes of distance metrics into an aggregate expression for distance or loss.

In addition to achieving an objective that includes the loss function 312, the system 300 may also be configured to achieve an objective related to a measure of compression in the compressed signal 306. In general, the measure of compression may be any suitable metric related to a size or complexity of the compact representation 306.

In some implementations, the measure of compression may be a relative measure of compression between the original RF signal 308 and the compressed signal 306. For example, to measure the compression achieved, a comparison may be made between the effective number of bits used to represent the dynamic range in the input 308 and output 310 continuous signal domains with that of the number of bits required to store the signal 306. As a specific example, if the input signal 308 has roughly 20 dB of signal-to-noise ratio, then the number of bits used to represent each continuous value may be calculated using Equation (1):

$$N_{\textit{eff}} = \left\lceil \frac{20 \text{ dB} - 1.76}{6.02} \right\rceil = 4 \text{ bits} \quad (1)$$

The result of Equation (1) may be compared with the number of bits used to represent the compact signal 306, to provide a relative measure of compression.

In some implementations, the measure of compression may be an absolute measure of complexity in the compressed signal 306. For example, the measure of compression may be a number of bits used to represent the compressed signal 306 (or to represent some unit of time or a number of samples of a given signal), or may relate to a measure of activation level in an intermediate activation layer in the encoder network 302 (e.g., layer 214 in FIG. 2).

In some implementations, as an alternative or in addition to achieving a compression-related objective, the system 300 may implement a hard constraint on compression, for example by implementing a small middle layer in the encoder network 302 (e.g., layer 214 in FIG. 2). In such implementations, the size of the middle layer, or number of activations in the middle layer, indicates a level of compression in the compressed representation 306.

During training, the encoder network 302 and/or decoder network 304 are updated based on results of compression and reconstruction. This updating may include various types of updates on the network architectures or parameters of the networks in the encoder 302 and/or decoder 304. For example, the updating may include updating weights in one or more layers of the networks, selecting machine-learning models for the encoder 302 and decoder 304, or selecting a specific network architecture, such as choice of layers, layer-hyperparameters, or other network features. As discussed, updating may be implemented on the encoder 302 and decoder 304 in a joint or iterative manner, or individually (as in the case where one of the networks is fixed).

In the example of FIG. 3, a joint update process for networks weights is illustrated. In this example, a weight update process 314 may update weight vectors, such as encoder weight vectors 316 and decoder weight vectors 318, in one or more layers of the encoder or decoder networks. The weight vectors may be learned to achieve an objective for the loss function 312, for example using an optimization method such as one of evolution, gradient descent, stochastic gradient descent, or other solution technique. The set of weights (or parameters) 316 and 318 may be learned using a number of training signals 208, which may be of the same type or of different types of RF signals. Depending on the composition of the training set of input signals 308, the encoder 302 and decoder 304 may be optimized to compress a certain type of radio signal or a wide range of different types of radio signals.

In general, updating the weight vectors/parameters in the encoder network 302 and/or the decoder network 304 may be based on the loss function 312, the measure of compression in the compact representation 306, the quality of the reconstruction of the signal, and/or other measures of performance, such as computational complexity or quality of the compressed representation of the signal. For example, in some implementations, the updating process 314 may seek to optimize an objective function that includes one or more of these metrics.

In such implementations, the objective function may include the loss function 312 and the measure of compression in the compressed signal 306, in addition to other possible metrics. The weight update process 314 may calculate a rate of change of the objective function relative to variations in the encoder network 302 and the decoder network 304, for example by calculating or approximating a gradient of the objective function. Such variations may include, for example, variations in the weight vectors 316 and 318, as shown in the example of FIG. 3.

Based on the calculated rate of change of the objective function, the weight update process 314 may determine a first variation for the encoder network 302 and/or a second variation for the decoder network 304. These variations may be computed, for example, using Stochastic Gradient Descent (SGD) style optimizers, such as Adam, AdaGrad, Nesterov SGD, or others. In some implementations, these variations may be computed using other scalable methods for direct search, such as evolutionary algorithms or particle swarm optimizations.

Once the variations have been determined, the update process 314 then applies those variations to the encoder network 302 and the decoder network 304. For example, in FIG. 3, the update process 314 updates at least one encoding network weight 316 in one or more layers of the encoder network 302, and/or updates at least one decoding network weight 318 in one or more layers of the decoder network 304.

In general, updating the encoder network 302 and decoder network 304 is not limited to updating network weights, and other types of updates may be implemented. For example, updating the encoder network 302 and the decoder network 304 may include selecting a machine-learning model for the encoder network 302, from among a plurality of encoding models, and selecting a machine-learning model for the decoder network 304, from among a plurality of decoding models. In such implementations, selecting machine-learning models may include selecting a specific network architecture, such as choice of layers, layer-hyperparameters, or other network features.

In selecting a network model, the model may be chosen to achieve a desired trade-off between model complexity, compressed signal representation complexity, and reconstruction accuracy/error. In some implementations, achieving this trade-off may be implemented using an objective function that combines these metrics. In addition or as an alternative, this trade-off may be achieved by selecting a model according to user preferences or application specifications.

The training data set of RF signals 308 may, in some implementations, be limited to a particular class of RF signals. In such scenarios, the system 300 will be trained to learn compact representations 306 that are tuned to compress that particular class of RF signals. By training on different classes of RF signals 308, the system 300 may learn different sets of compact representations 306 that are applicable to different classes of RF signals 308.

During training, the encoder network 102 may be configured to learn a mapping from RF signal inputs 308 into a lower-dimension sparse form as the compact representation 306. The decoder network 304 may be configured to learn a reverse mapping from the lower-dimension compact representation 306 into a higher-dimension signal that represents the reconstructed signal 310.

In some implementations, the encoding and decoding mappings may involve a set of basis functions. The basis functions may be used by the encoder network 302 to process the input signal 308 and generate projections onto the basis to form the compressed signal 306. The decoder 304 may then use the same set of basis functions to process the compressed signal 306 and generate the second RF signal, for example by taking linear combinations of the basis functions weighted by coefficients according to the compressed signal 306.

The basis functions may be any suitable set of orthogonal or non-orthogonal set of basis functions that can represent the RF signal 308. For example, the basis functions may be In-Phase and Quadrature-Phase (I/Q) signals, Fourier basis functions, polynomial basis functions, Gaussian basis functions, exponential basis functions, wavelet basis functions, or combinations of these and/or other suitable set of basis functions that can be utilized represent RF signals. The basis functions may have different phase, amplitude, and/or frequency components. In some implementations, the basis functions may be parameterized and the training may involve optimizing over parameters of the basis functions.

As a specific example, if the basis functions are Fourier basis functions, then the encoder network 302 may implement a bank of filters each tuned to a particular frequency, and may process the RF signal 308 by correlating the RF signal 308 with the filters to generate a set of basis coefficients as the compressed signal 306. The decoder network 304 may then generate the reconstructed signal 310 by generating a weighted combination of the same or different set of basis signals, according to weighting coefficients represented by the compressed signal 306. For example, the encoder network 302 and decoder network 304 may use tied or non-tied weights.

The training of the encoder 302 and decoder 304 may begin with any suitable set of initial conditions. For example, the training may begin with a random set of basis functions subject to certain conditions. Alternatively, the training may begin with a fixed set of basis functions, such as commonly used RF communication basis functions including Quadrature Phase-Shift Keying (QPSK) or Gaussian Binary Frequency Shift Keying (GFSK), orthogonal frequency division multiple access (OFDM), or other fixed set of basis functions.

During training, the encoder 302 and decoder 304 attempt to learn improved basis functions, according to results of compression and/or reconstruction. Training the encoder 102 and decoder 104 may involve optimizing over a set of basis functions or over different sets of basis functions, for example using greedy search or other optimization-type algorithm.

Figure 4:
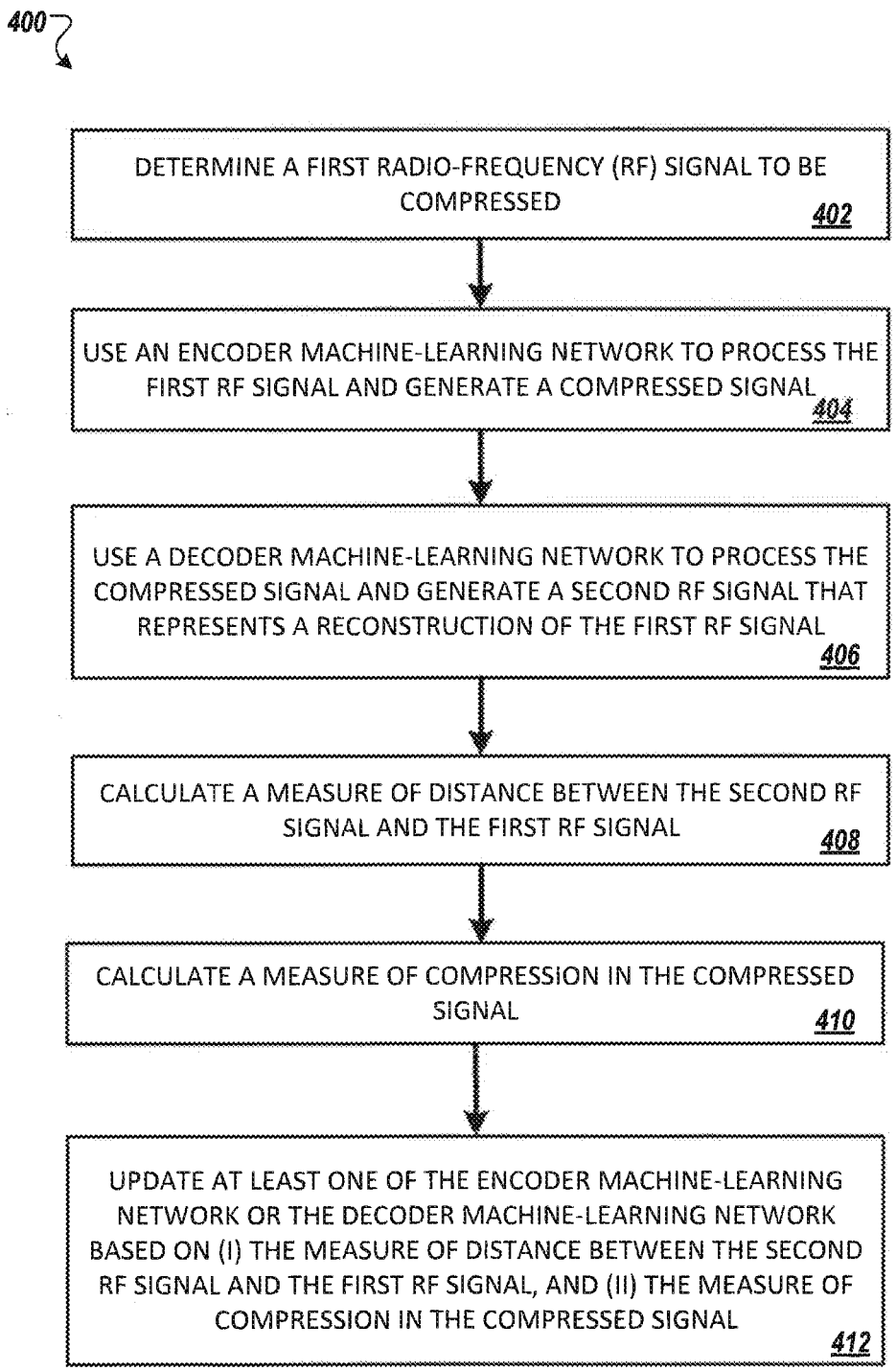
FIG. 4 is a flowchart illustrating an example of training an RF system that implements machine-learning encoder and decoder networks to learn compact representations of RF signals.

FIG. 4 is a flowchart illustrating an example of training an RF system that implements machine-learning encoder and decoder networks to learn compact representations of RF signals. The training method 400 described by the example of FIG. 4 may be performed by one or more processors, such as one or more CPUs, GPUs, DSPs, FPGAs, ASICs, TPUs, or neuromorphic chips or vector accelerators that execute instructions encoded on a computer storage medium.

The training method 400 includes determining a first RF signal to be compressed (402). An encoder machine-learning network is used to process this first RF signal and to generate a compressed signal (404). This compression process may utilize any suitable mapping from a higher-dimension space onto a lower-dimension space, as discussed in regards to FIG. 3, above.

A decoder machine-learning network is then used to process the compressed signal and generate a second RF signal that represents a reconstruction of the first RF signal (406). This decompression process may utilize any suitable mapping from a lower-dimension space onto a higher-dimension space, as discussed in regards to FIG. 3, above.

A measure of distance is calculated between the second RF signal and the first RF signal (408). This measure of distance may be implemented as a loss function (e.g., loss function 312 in FIG. 3) and may represent a difference or error between the original RF signal and the reconstructed RF signal. As examples, the measure of distance may include cross-entropy, mean squared error, or other geometric distance metric (e.g., MSE, MAE, KL divergence), or may combine several geometric and/or entropy-based distance metrics into an aggregate expression for distance.

In addition, a measure of compression in the compressed signal is calculated (410). The measure of compression may be any suitable measure of complexity of the compressed signal representation. For example, the measure of compression may be a relative measure of compression between the original RF signal and the compressed signal. Alternatively, the measure of compression may be an absolute measure of complexity in the compressed signal, such as a number of bits used to represent the compressed signal or a measure of activations in a sparse layer of the encoder network, as discussed in regards to FIG. 3, above.

The training method further includes updating at least one of the encoder network or the decoder based on (i) the measure of distance between the second RF signal and the first RF signal, and (ii) the measure of compression in the compressed signal (412). This update may be applied to the encoder and decoder networks in a joint or iterative manner, or individually. The updates may generally include updating any suitable machine-learning network feature of the encoder and decoder, such as network weights, architecture choice, machine-learning model, or other parameter or connectivity design, as discussed in regards to FIG. 3, above.

Figure 5:
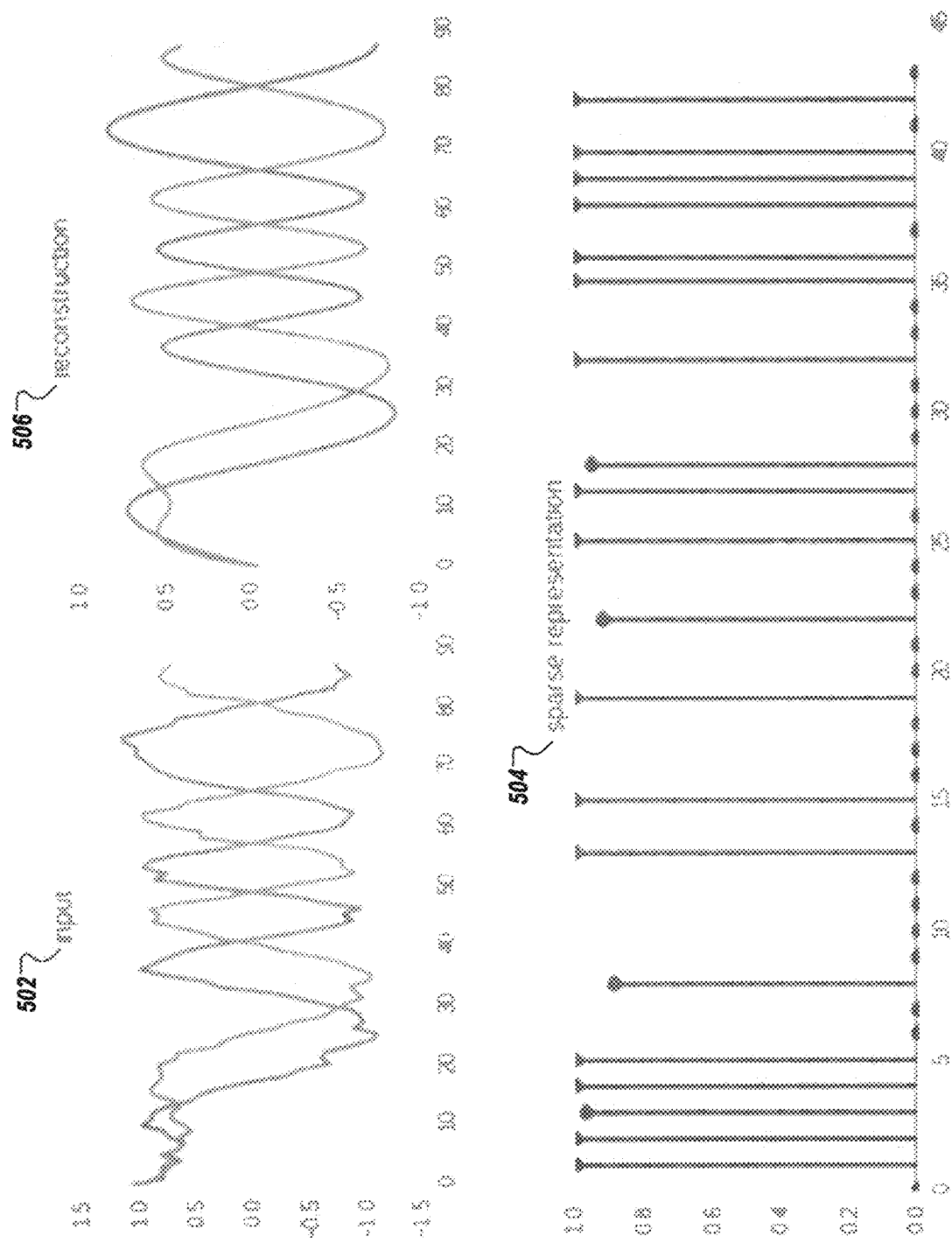
FIG. 5 illustrates an example of an RF signal and a compact representation of the RF signal that may be learned by machine-learning networks.

FIG. 5 illustrates an example of an RF signal and a compact representation of the RF signal that may be learned by machine-learning networks. This example illustrates a signal compression effect on a signal, including an input signal 502, compressed representation 504, and reconstructed signal 506. The example of FIG. 5 illustrates an example using a particular type of input signal 502, namely a QPSK-modulated carrier signal. However, the compact representation learning techniques disclosed herein may be applied to any suitable type of RF signal.

As shown in this example, the input signal 502 is encoded by an encoder machine-learning network (e.g., encoder network 302 in FIG. 3, above) to produce an intermediate compressed signal representation 504. This compressed signal representation 504 is then processed by a decoder machine-learning network (e.g., decoder network 304 in FIG. 3, above) to produce an output signal 506, which is a reconstruction of the original signal 502.

The compact representation 504 is a representation of the input signal 502 that has been learned through training an encoder and decoder, as explained in regards to FIG. 3, above. In particular, as discussed above, an encoder and a decoder were trained on various sample data sets of RF signals, and the trained encoder and decoder were applied to the particular input signal 502 to generate the compact representation 504 and resulting reconstructed signal 506.

In this example, the compact representation 504 indicates that the machine-learning encoder and decoder have learned a nearly binary representation of the continuous signal 502. Using this learned compact representation 504, the decoder is able to generate a reconstruction signal 506 that closely approximates the input signal 502.

Figure 6A:
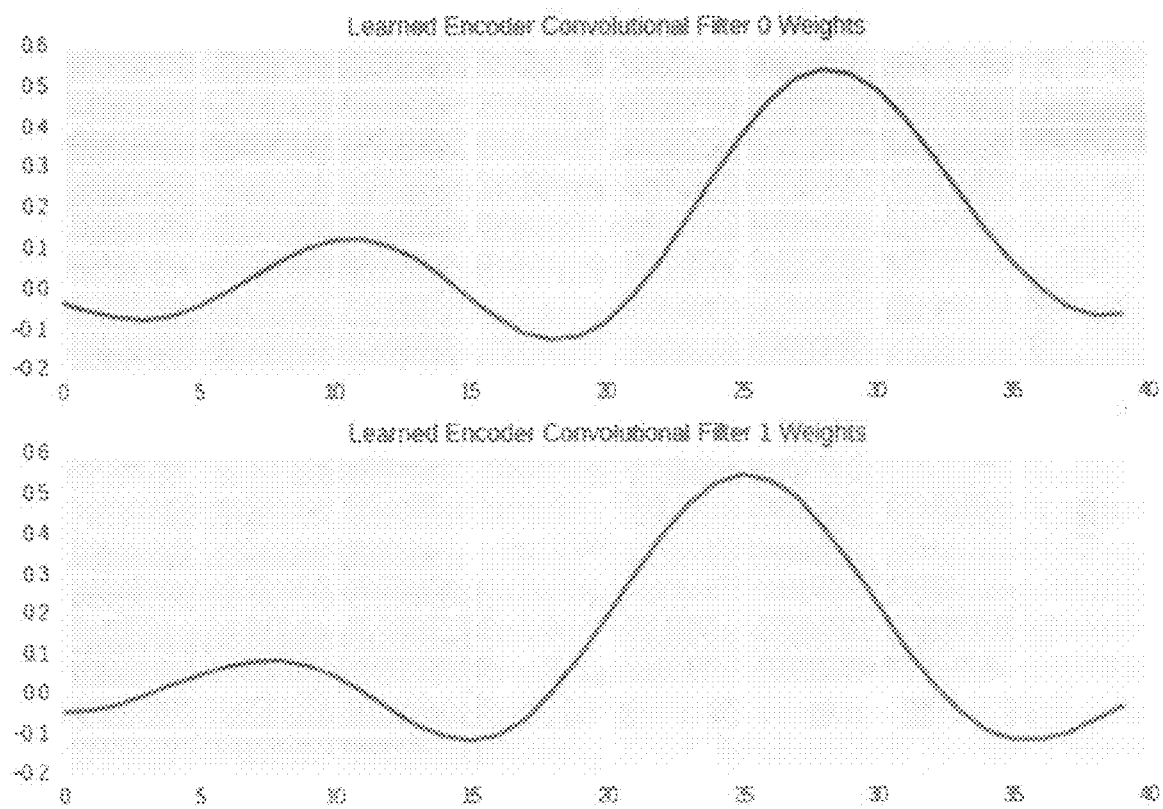
FIGS. 6A and 6B illustrate examples of weight vectors for encoder and decoder networks, respectively, that may be learned for compact representations of RF signals.
Figure 6B:
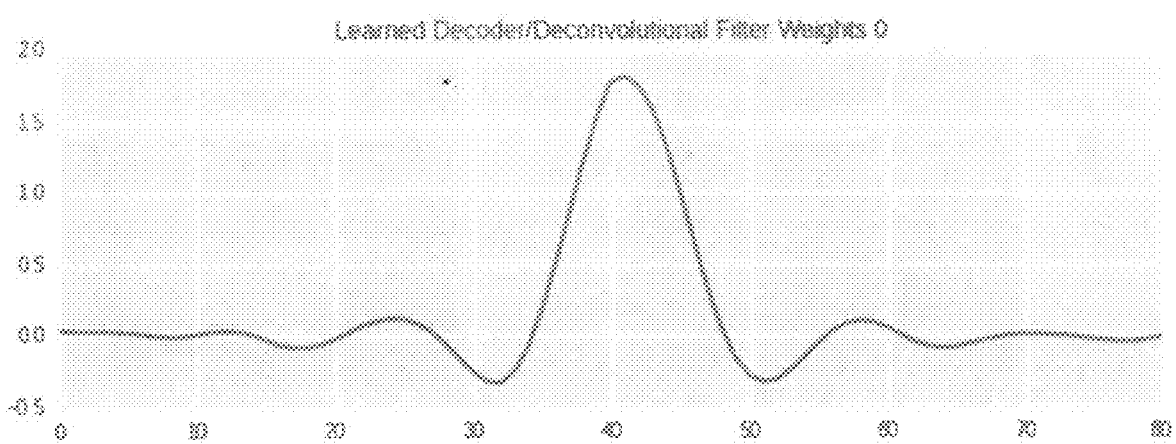

FIGS. 6A and 6B illustrate examples of weight vectors for encoder and decoder networks, respectively, that may be learned for compact representations of RF signals. This illustrates an example of one form of weight vectors learned from system training on a radio signal, as discussed in regards to FIG. 3, above. The example of FIGS. 6A and 6B illustrate an example using a particular type of input signal, namely a QPSK-modulated carrier signal. However, the weight-vector learning techniques disclosed herein may be applied to any suitable type of RF signal.

FIG. 6A illustrates weight vectors that may be learned for an encoder network. In this example, convolutional weight vectors are implemented in the encoder first layer (e.g., layer 212 in FIG. 2). The upper graph of FIG. 6A shows a first sinusoid that occurs at varying time offsets to form detections, and the lower graph of FIG. 6A shows a second sinusoid at double the frequency, both with some minimal pulse shaping apparent on them.

FIG. 6B illustrates corresponding weight vectors that may be learned for a decoder network, using the same type if signal as in FIG. 6A. In this example, the decoder convolutional weight vector has a pulse-shaping filter shape.

The weight vectors in FIGS. 6A and 6B may correspond to the weight vectors 316 and 318 that are learned during the training process described in FIG. 3. Although the example of FIGS. 6A and 6B illustrate a result of weight vectors for only a very simple convolutional network layer used in the encoder and decoder, other types of network layers may be implemented, which have different forms of structure and weight vectors. As can be seen visually, the system learns the signal modulation symbol and roll-off used in the transmission system without being explicitly provided with this information (e.g., the system may learn the structural components/bases of the signal in a fully unsupervised way). In some implementations, the system also learns the feature of staggered time-offset of symbols that is used within a digital radio modulation system, and the intermediate compressed representation may directly relate to the data bits of the transmission along with some representation of the channel state information (CSI). In some instances, the use of signal processing operations such as synchronization can selectively modify the data and CSI content present in the compressed representation.

The weight complexity may be determined based on the number and types of layers in the network. Some of these layers may be convolutional layers (e.g., layers 212 and 218 in FIG. 2), while others may be dense layers (e.g., 214, 216 in FIG. 2). For example, the layers may include two 2D convolutional layers, 2×1×1×40 and 1×1×1×81, making a total of only 161 parameters. These convolutional network layer parameters are learned to fit the translation invariant filter features which form the primary input and output for the network. The layers may also include dense layers, which provide mappings from occurrences of these filter weights to a sparse code and back to a wide representation. The dense layers may consist of, for example, weight matrices of 516×44 and 44×176, respectively, making a total of 30448 dense floating-point weight values. In general, larger sizes of networks, with more and/or other types of layers, may be implemented, implementing different types of network weights.

Figure 7:
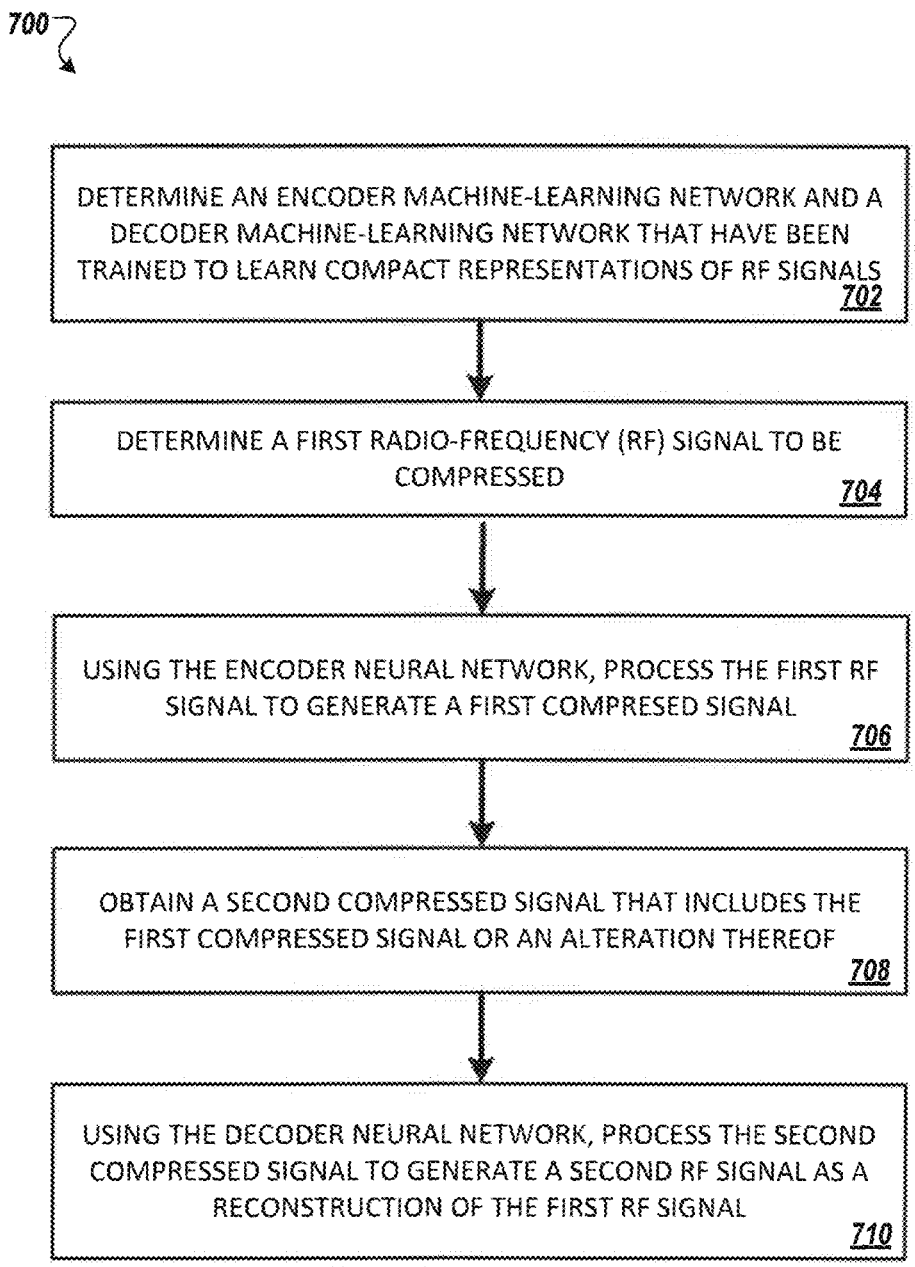
FIG. 7 is a flowchart illustrating an example of deploying a trained RF system to perform learned compression and decompression of RF signals.

FIG. 7 is a flowchart illustrating an example of deploying a trained machine-learning encoder and decoder to perform learned compression and decompression of RF signals. Such deployment may utilize encoder and decoder networks that have been previously trained, for example by using a training technique as shown in FIG. 4 or similar training methods.

In this example, a method 700 of performing learned compression of RF signals includes determining an encoder machine-learning network and a decoder machine-learning network that have been trained to compress and decompress RF signals (702). The encoder network and decoder network may have been trained jointly, iteratively, or independently. In some implementations, the encoder and decoder may have been jointly trained as an auto-encoder, such as a variational auto-encoder, as discussed in regards to FIG. 3, above.

A first RF signal is determined to be compressed (704). As discussed above, the first RF signal may be in digital or analog form, and may represent an RF waveform that has been received by one or more antennas, or an RF waveform that has been obtained by other techniques.

The encoder machine-learning network processes the first RF signal and generates a first compressed signal (706). The compressed signal may correspond to a compact representation (e.g., 106 in FIG. 1) that has been learned through training. In some implementations, the encoder network may be an artificial neural network, and the compressed signal may represent an output of a layer of an encoder network.

The first compressed signal may then be transmitted or stored in a communication or storage medium, and a second compressed signal may be obtained that includes the first compressed signal or an alteration thereof (708).

The decoder machine-learning network then processes the second compressed signal to generate a second RF signal as a reconstruction of the first RF signal (710). The decoder machine-learning network may be implemented as an artificial neural network, and the second RF signal may be an output of a layer of the decoder network, as discussed in regards to FIGS. 2 and 3, above.

The encoding and decoding operations in FIG. 7 may be performed at separate locations or times, as part of an overall compression and decompress process that is performed during transmission and reception, or storage and retrieval, of RF information. Alternatively, or additionally, the encoding and decoding operations in FIG. 7 may be performed at a common location, for example as part of a signal monitoring or analysis process.

Figure 8:
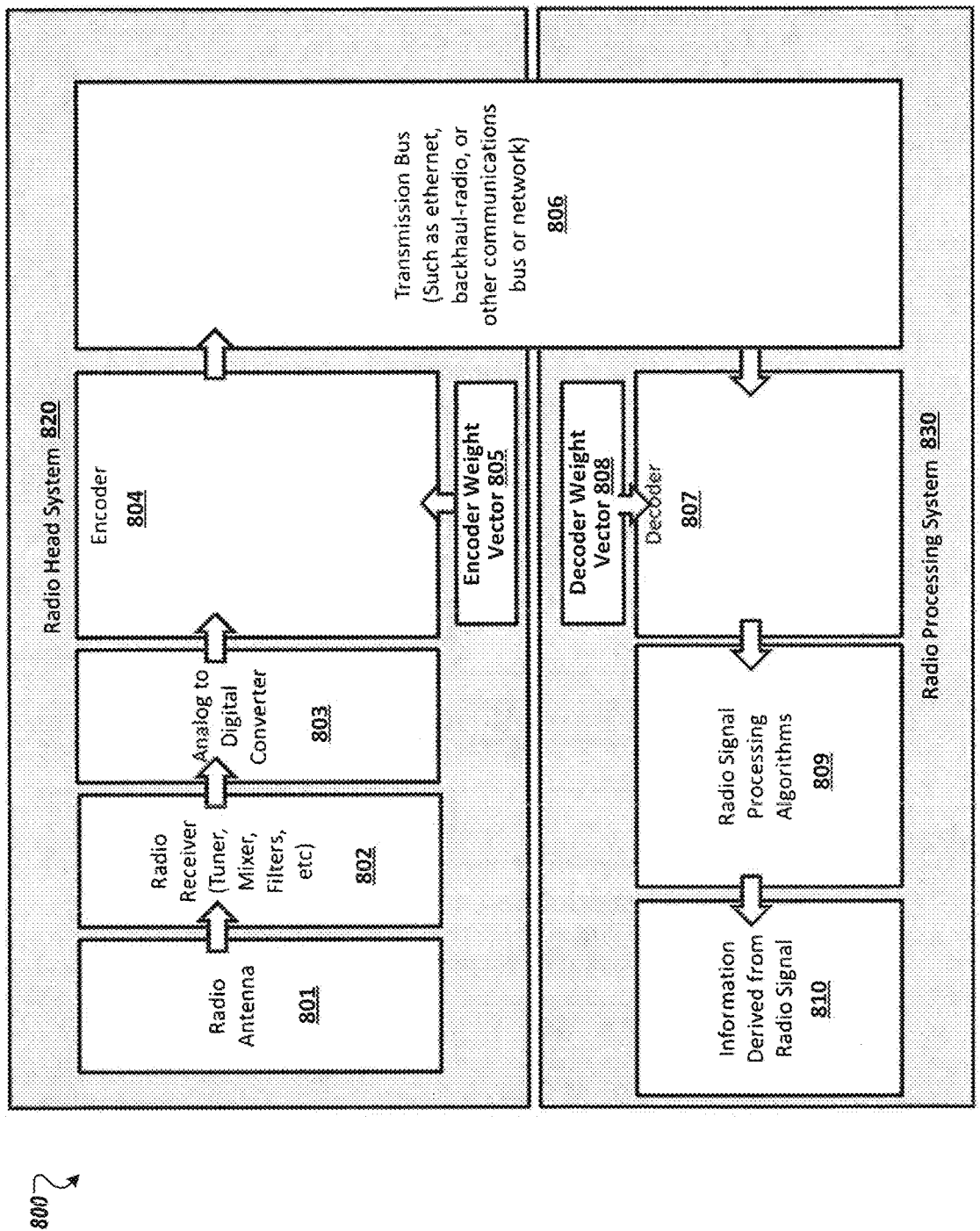
FIGS. 8 and 9 illustrate example systems of deploying a trained RF system to perform learned compression of RF signals and transport of the compressed RF signals.
Figure 9:
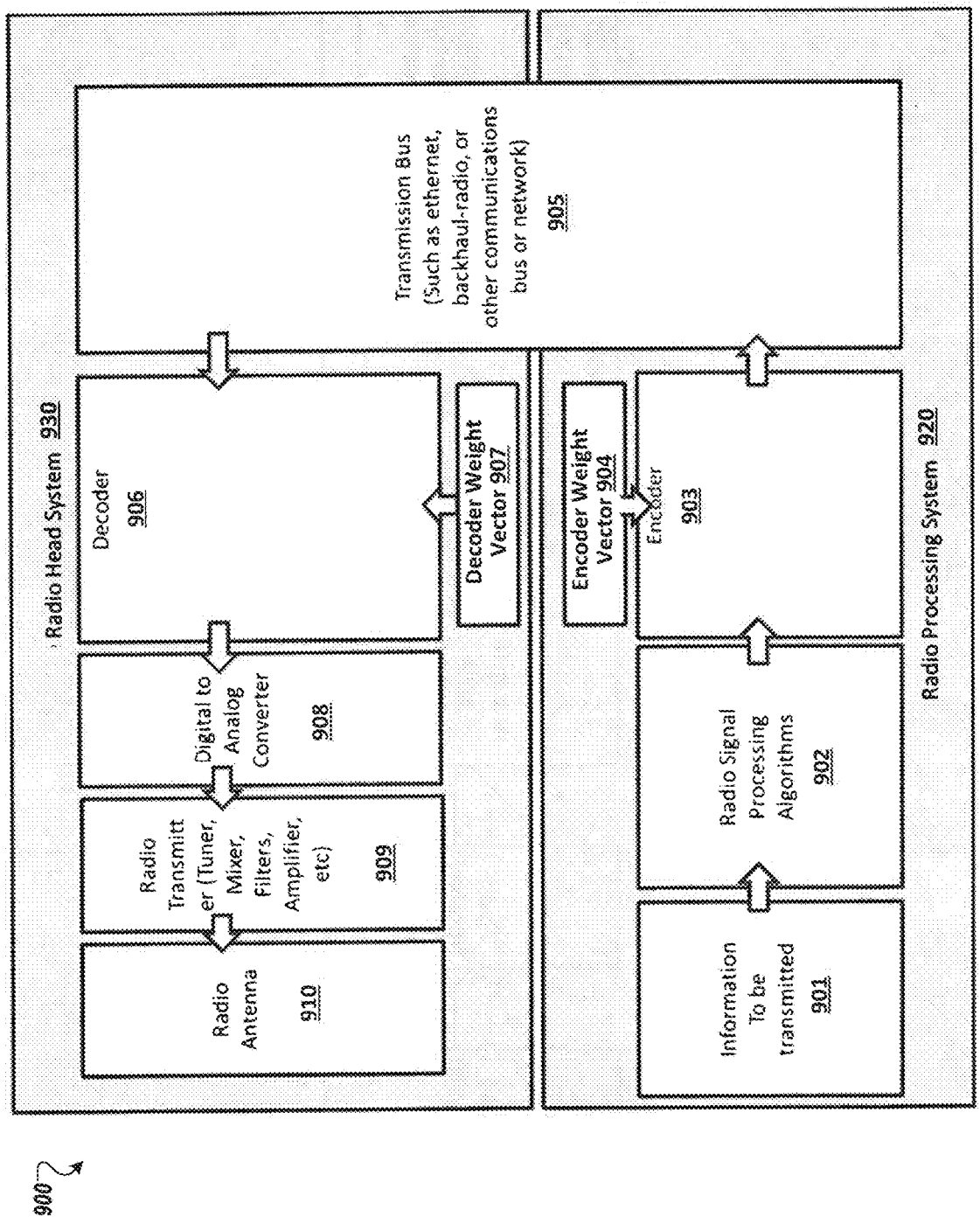

FIGS. 8 and 9 illustrate example systems of deploying trained machine-learning encoders and decoders for transport of compact representations of RF signals that have been received (FIG. 8) or that are to be transmitted over a medium, such as over the air (FIG. 9). In the systems 800 and 900 illustrated in FIGS. 8 and 9, respectively, the disclosed techniques may provide efficient compression that enables use of lower bandwidth for transporting RF signals between different communication systems, before the RF signals are transmitted, or after the RF signals are received.

FIG. 8 illustrates an example system 800 of deploying a trained machine-learning encoder and decoder to transport a compact representation of an RF signal that was received. The system 800 includes a radio head system 820 and a radio processing system 830. The radio head system 820 and radio processing system 830 may be geographically remote systems, or may be sub-systems of a common system.

In the system 800, the radio head system 820 receives an RF waveform over a medium, such as over the air, and is designed to transport information about the received RF signal to the radio processing system 830 for further processing. In such scenarios, implementations disclosed herein enable reduced bandwidth for performing the back-end communication between the radio head system 820 and the radio processing system 830.

In this example, the radio head system 820 receives an RF waveform through one or more antennas 801 and tunes/filters the band of interest using a radio receiver 802. The radio head system 820 then performs analog signal to digital conversion, for example using an A/D converter 803, to generate a time-series RF signal.

A machine-learning encoder 804 compresses the RF signal into a compact representation using a set of encoder weights 805, as discussed in regards to FIG. 7, step 706, above. As discussed above, the encoder 804 may have been previously trained to compress RF signals, for example using the training described in regards to FIGS. 3 and 4, above.

The compressed signal generated by the encoder 804 may then be transmitted across a transmission bus 806, such as Ethernet, an IP network, a backhaul radio, or any other communications system. Transmission of the compressed signal uses less bandwidth and power than it would use to transmit the un-encoded RF signal.

A radio processing system 830 then receives the compressed signal and passes it through a machine-learning decoder 807 using the corresponding decoder weights 808 to obtain a reconstruction of the received radio signal, as discussed in regards to FIG. 7, step 710, above. As discussed above, the decoder 807 may have been previously trained to decompress RF signals, for example using the training described in regards to FIGS. 3 and 4, above.

The reconstructed (decompressed) RF signal that is generated by decoder 807 may then be processed by an RF signal-processor 809, such as a radio signal demodulator, detector, estimator, other signal processing algorithm/task or machine learning algorithm/task. This signal processor 809 may derive various types of information 810 from the reconstructed RF signal, such as information about what is in the RF signal, what information was transmitted in the RF signal, what emitters are present, or any other information derived from the RF signal that was originally received by the radio head system 820. This information may then be passed to another system or control layer which may transmit the information, take some action based on it, represent this information to a user, or any other action.

FIG. 9 illustrates an example system 900 of deploying a trained machine-learning encoder and decoder to transport a compact representation of an RF signal that is to be transmitted over a medium, such as over the air. This describes the inverse operation to that which is described in FIG. 8, above. The system 900 includes a radio processing system 920 and a radio head system 930. The radio processing system 920 and radio head system 930 may be geographically remote systems, or may be sub-systems of a common system, as discussed in regards to FIG. 8, above.

In system 900, the radio signal processing system 920 is designed to transport information to the radio head system 930 for transmission of the information in an RF waveform through a medium, such as over the air. In such scenarios, implementations disclosed herein enable reduced bandwidth for performing the back-end communication between the radio processing system 920 and radio head system 930.

In his example, the radio signal processing system 920 obtains information 901, which may be generally any form of digital or analog information that is to be communicated.

For example, the information 901 may be a string of bits representing image, video, audio, IP packets, or other forms of data. The information 901 may have been retrieved from a storage medium, or received through another communication medium.

A radio signal-processor 902 modulates and/or performs other signal processing of the information 901 to generate an RF signal. The RF signal may be a continuous-time waveform or may be a discrete-time series representation of a waveform.

A machine-learning encoder 903 then compresses the RF signal into a compact representation using a set of encoder weights 904, as discussed in regards to FIG. 7, step 706, above. The encoder 903 may have been previously trained to compress RF signals, for example using the training described in regards to FIGS. 3 and 4, above.

This compact representation is then transmitted over a transmission bus 905, such as Ethernet, an IP network, a backhaul radio, or any other communications system. Transmission of the compressed signal uses less bandwidth and power than it would use to transmit the un-encoded RF signal.

The compact representation is then received by the radio head system 930 and is passed through a decoder 906 employing a set of decoder weights 907 which generates a reconstructed RF signal, as discussed in regards to FIG. 7, step 710, above. As discussed above, the decoder 906 may have been previously trained to decompress RF signals, for example using the training described in regards to FIGS. 3 and 4, above.

The reconstructed (decompressed) RF signal that is generated by decoder 906 is then converted from digital to analog, for example using a D/A converter 908. The analog signal is then processed by radio transmitter 909 to be mixed to an appropriate radio band for transmission, and to be filtered and amplified as necessary. The processed RF waveform is then transmitted via one or more antennas 910 over a wireless channel. In such scenarios, the wireless transmission may be a cellular transmission to a user, a broadcast of information, or other packet or non-packet transmission.

In some implementations, a system may implement a joint radio transmission and reception system (transceiver) with disjoint radio head and radio signal processing subsystems that implement the systems described in regards to FIGS. 8 and 9, above. The systems may share hardware such as mixers, antennas, processors, memory, and transmission bus between the transmission and reception halves described above. In this case, control logic, such as a Media Access Control layer implementation for a wireless protocol, may exist as part of the signal processing algorithms, linking in a feedback process whereby actions may be taken in one due to events occurring in the other.

Figure 10:
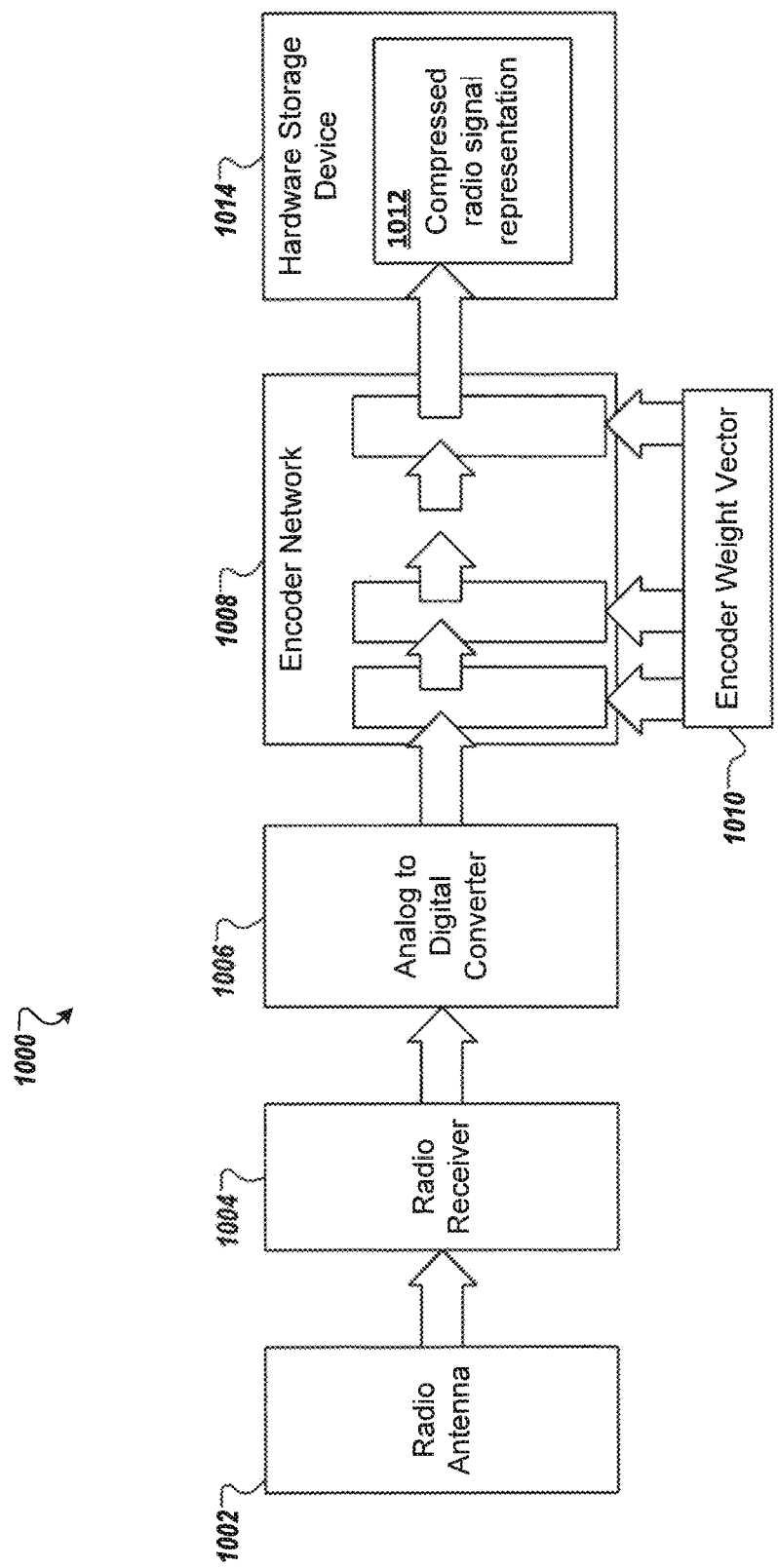
FIG. 10 illustrates an example system of deploying a trained RF system to perform learned compression of RF signals and storage of the compressed RF signals.

FIG. 10 illustrates an example system 100 of deploying a trained machine-learning encoder to perform learned compression of RF signals for storage in a memory device.

In this example system 1000, a radio waveform is received by one or more antennas 1002, and is processed by a radio receiver 1004 for tuning and filtering to an appropriate radio band. The RF processed waveform is then converted to digital representation, for example by an analog to digital converter 1006, to generate an RF signal as a discrete-time series of sampled values.

A machine-learning encoder 1008 then utilizes a set of encoding weights 1010 to compress the RF signal and generate a compressed representation 1012, as discussed in regards to FIG. 7, step 706, above. The encoder 1008 may have been previously trained to compress RF signals, for example using the training described in regards to FIGS. 3 and 4, above.

The compressed signal 1012 is then stored in a file or files on a hardware storage device 1014, for later retrieval. Implementations disclosed herein may therefore enable a smaller footprint for storing the compressed signal 1012, as compared to storing the RF signal itself.

The encoder network 1008 may be implemented as a neural network including a series of layers which constitute an encoder model, along with the set of weights 1010 that were learned during a training process. A reconstructed version of the original RF signal may later be obtained using the corresponding decoder, e.g., as described in FIG. 7, step 710, above.

This technique allows for the storage of longer radio signals on storage devices, the use of smaller, cheaper, and/or slower storage devices for the same time-length and type of radio signal (e.g., in seconds), recording at higher data rates or with more antennas (e.g., more samples per second), the use of lower cost hardware, and longer recordings (e.g., in seconds) that improve the performance of storing digital radio signals.

Figure 11:
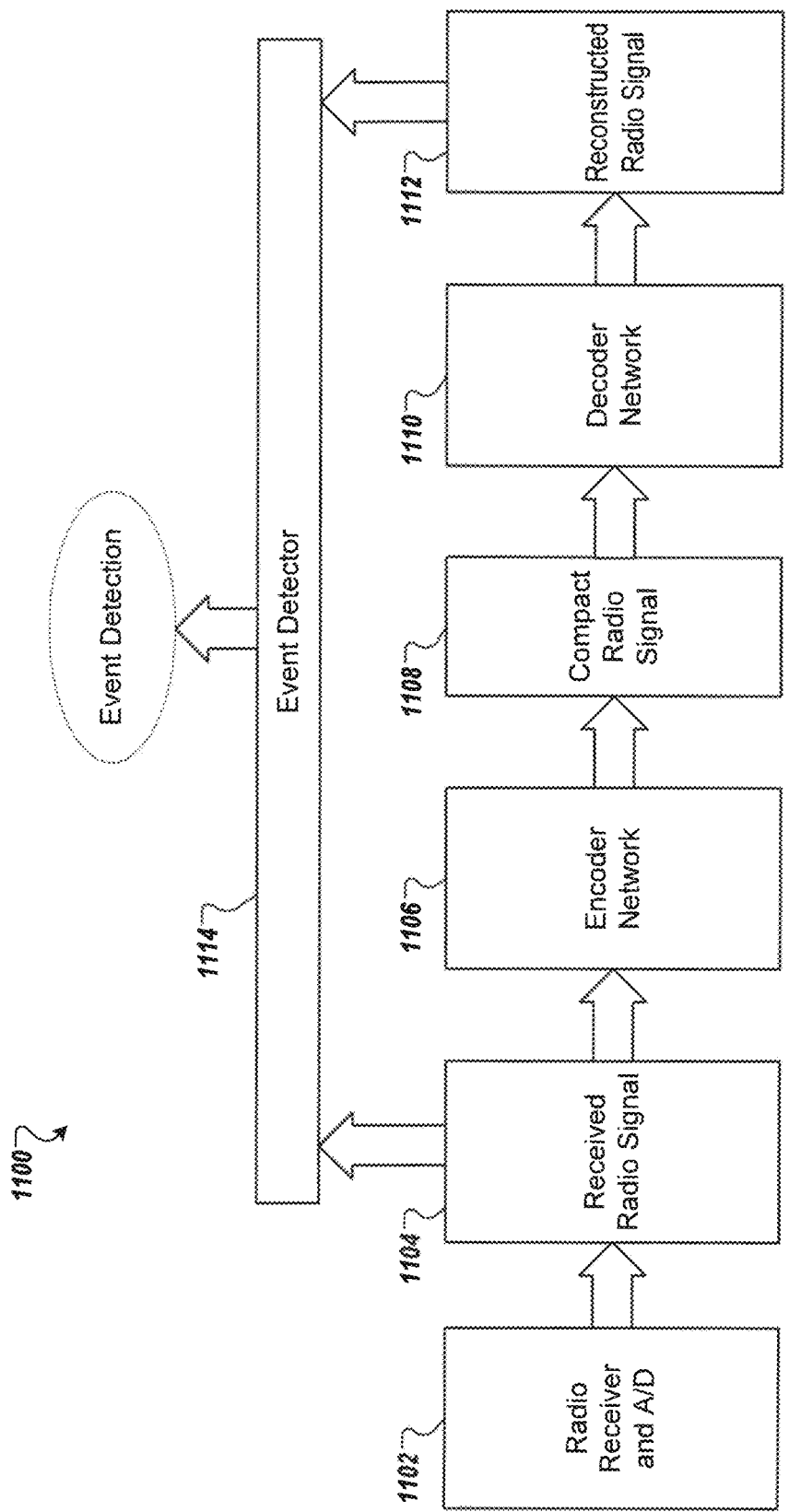
FIG. 11 illustrates an example system of deploying a trained RF system to perform learned compression and decompression of RF signals for detecting events of interest in the RF signals.

FIG. 11 illustrates an example system 1100 of deploying a trained machine-learning encoder and decoder to perform learned compression and decompression of RF signals for detecting events of interest in the RF signals. The system 1100 includes both a machine-learning encoder 1106 and decoder network 1110 that perform compression and decompression, respectively, as described in regards to FIG. 1, above.

In some scenarios, the 1106 encoder and decoder 1110 may be implemented as part of a sensor system that receives and processes RF waveforms through a medium, such as over the air, to detect events of interest that occur in RF signals. In some implementations, the encoder 1106 and decoder 1110 may be implemented as an auto-encoder structure, as discussed in regards to FIG. 2, above.

In this example, a radio receiver system 1102 receives an input RF waveform, for example using one or more antennas. The radio receiver system may include various filters, samplers, and A/D converters to generate an RF signal 1104, which may be a discrete-time signal, from a received RF waveform.

A machine-learning encoder network 1106 then processes the received RF signal 1104 using a set of encoding weights to compress the RF signal 1104 into a compressed signal 1108, as discussed in regards to FIG. 7, step 706, above. The encoder 1106 may have been previously trained to compress RF signals, for example using the training described in regards to FIGS. 3 and 4, above.

A machine-learning decoder network 1110 then processes the compressed signal 1108 using a set of decoding weights to generate a reconstructed signal 1112, as discussed in regards to FIG. 7, step 710, above. The decoder 1110 may have been previously trained to decompress RF signals, for example using the training described in regards to FIGS. 3 and 4, above.

An event detector 1114 may then compare the reconstructed signal 1112 with the original received RF signal 1104 to determine whether an event of interest has occurred in the RF signal. Such events may include, for example, an occurrence of an error in the RF signal, an anomaly in the RF signal (e.g., malicious snooping), or other types of changes occurring in the RF signal, or in a plurality of transmitted RF signals that are included within the RF signal.

The detection of an event may be determined, for example, by calculating a measure of distance between the reconstructed RF signal 1112 and the received RF signal 1104. Various metrics may be utilized to analyze the measure of distance and to determine whether an event has occurred. For example, an event may be detected based on the measure of distance exceeding a threshold, or based on the measure of distance differing from an expected measure of distance that is known to correspond to the particular encoder and decoder model that is implemented, or based on the measure of distance satisfying other suitable criteria indicating an occurrence of an event of interest.

Figure 12:
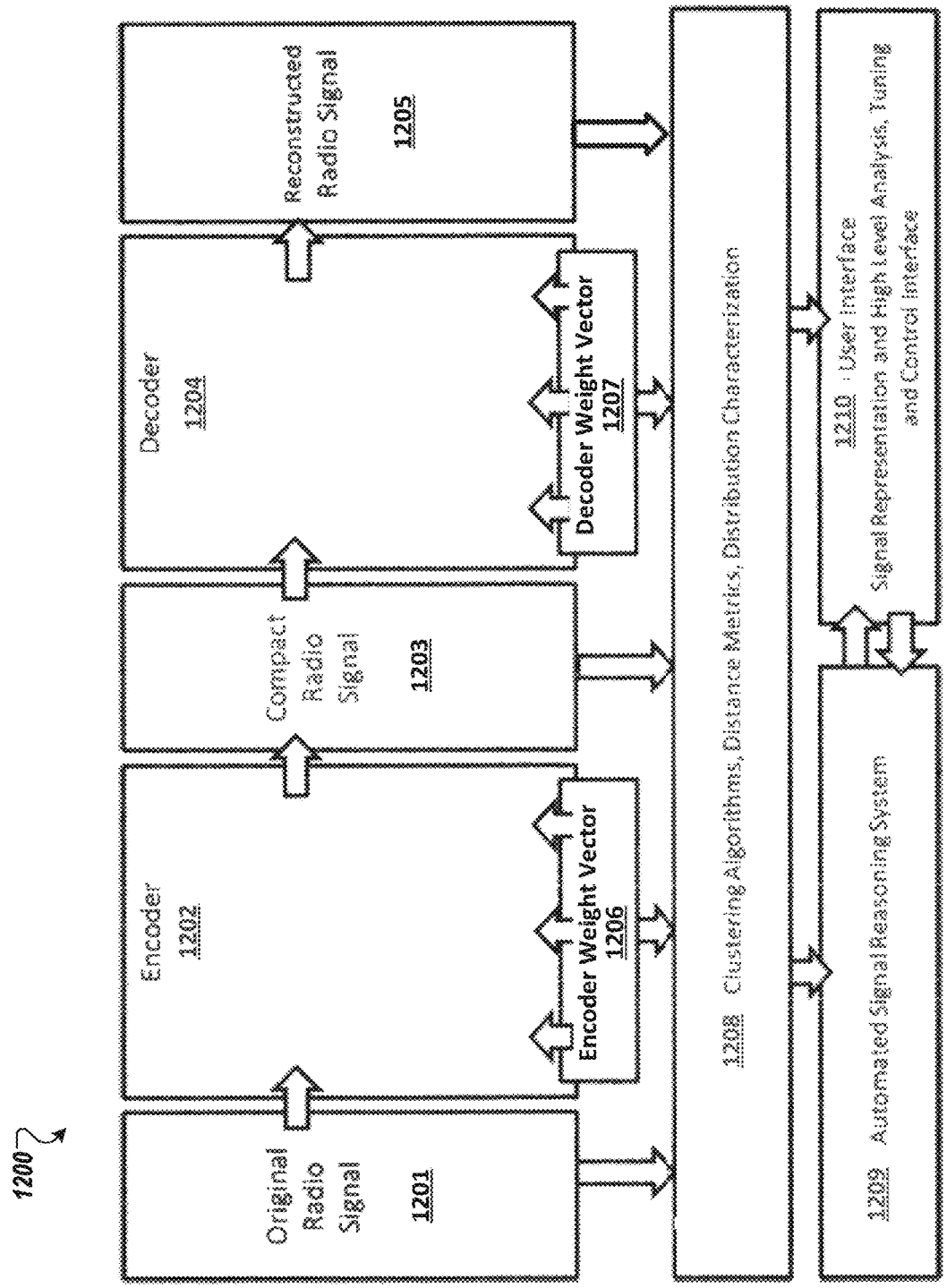
FIG. 12 illustrates an example system of deploying a trained RF system to perform signal analysis, signal structure understanding, high-level reasoning based on RF signals, and a user interface based on representations learned on one or more RF signals.

FIG. 12 illustrates an example system 1200 of deploying a trained machine-learning encoder and decoder to perform signal analysis, signal structure understanding, high-level reasoning based on RF signals, and generating representations learned on one or more RF signals.

In system 1200, an input RF signal 1201 is processed by a machine-learning encoder network 1202 using a learned encoding process and learned network weights 1206 to generate a compact radio representation 1203, as discussed in regards to FIG. 7, step 706, above. The encoder 1202 may have been previously trained to compress RF signals, for example using the training described in regards to FIGS. 3 and 4, above.

A machine-learning decoder network 1204 then processes the compact radio representation 1203 using a learned decoding process and learned network weights 1207 to generate a reconstructed RF signal 1205, as discussed in regards to FIG. 7, step 710, above. The decoder 1204 may have been previously trained to decompress RF signals, for example using the training described in regards to FIGS. 3 and 4, above.

In some implementations, various representations 1208 may be gleaned from the compression and decompression to extract information and perform analysis regarding RF signals and/or the RF environment. For example, the representations 1208 may related to the structure or models in the encoder network 1202 and decoder network 1204, respective network weights 1206 and 1207, and/or respective inputs and outputs. The representations 1208 may include, for example, a set of clustering algorithms, distance metrics, or other characterizations or representations of the distributions in the representations 1208.

The representations 1208 may be leveraged by various types of systems or processes to perform analysis. For example, a set of automated signal reasoning subsystems 1209 process the representations 1208 to analyze the RF input signals 1201 and information derived therefrom, for example to determine a similarity or difference between different RF signals, or attempt to label the RF signals with information. In some implementations, the automated reasoning system 1209 may determine a change of the RF signal 1201 over time, predict future values of the RF signal 1201, predict the underlying state of a communications system through which the RF signal 1201 was received, or determine a difference between several known types or modes of underlying RF signals. In some implementations, the automated reasoning system 1209 may implement training mappings from the sequence of sparse/compact representations 1203 to alternate sequences of representations, such as words, bits, other sparse representations.

In some implementations, a user interface 1210 may be implemented to enable user interaction with the representations 1208 and with the automated reasoning system 1209. The user interface 1210 may generate output results that help explain to a user what types of RF signals are present, what actions may be occurring in the radio or physical environments, what spectrum resources are used or free, or other types of high-level human-interpretable information about the environment determined from a radio antenna that resulted in the original RF signal 1201.

Figure 13:
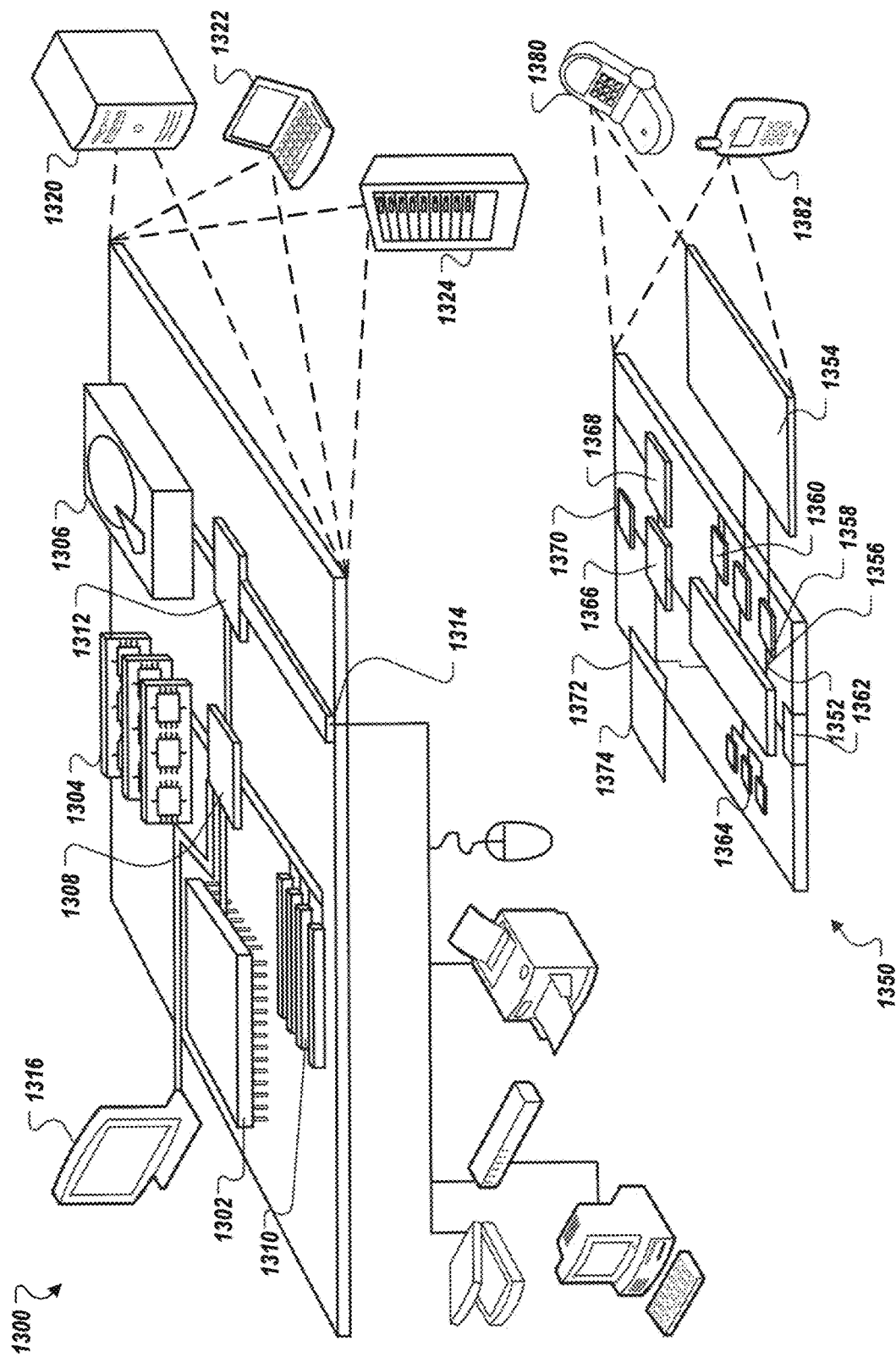
FIG. 13 is a diagram illustrating an example of a computing system that may be used to implement one or more components of an RF system that implements machine-learning encoder and decoder networks to perform learned compression and decompression of RF signals.

FIG. 13 is a diagram illustrating an example of a computing system that may be used to implement one or more components of a system that performs learned compression and decompression of RF signals.

The computing system illustrated in FIG. 13 includes an example of a computing device 1300 and a mobile computing device 1350 that can be used to implement the techniques described herein. For example, one or more parts of an encoder machine-learning network system or a decoder machine-learning network system could be an example of the system 1300 described here, such as a computer system implemented in any of the machine-learning networks, devices that access information from the machine-learning networks, or a server that accesses or stores information regarding the compression and decompression performed by the machine-learning networks.

The computing device 1300 is intended to represent various forms of digital computers, such as laptops, desktops, workstations, personal digital assistants, servers, blade servers, mainframes, and other appropriate computers. The mobile computing device 1350 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1300 includes a processor 1302, a memory 1304, a storage device 1306, a high-speed interface 1308 connecting to the memory 1304 and multiple high-speed expansion ports 1310, and a low-speed interface 1312 connecting to a low-speed expansion port 1314 and the storage device 1306. Each of the processor 1302, the memory 1304, the storage device 1306, the high-speed interface 1308, the high-speed expansion ports 1310, and the low-speed interface 1312, are interconnected using various busses, and may be mounted on a common motherboard or in other manners as appropriate. The processor 1302 can process instructions for execution within the computing device 1300, including instructions stored in the memory 1304 or on the storage device 1306 to display graphical information for a GUI on an external input/output device, such as a display 1316 coupled to the high-speed interface 1308. In other implementations, multiple processors and/or multiple buses may be used, as appropriate, along with multiple memories and types of memory. In addition, multiple computing devices may be connected, with each device providing portions of the necessary operations (e.g., as a server bank, a group of blade servers, or a multi-processor system). In some implementations, the processor 1302 is a single-threaded processor. In some implementations, the processor 1302 is a multi-threaded processor. In some implementations, the processor 1302 is a quantum computer.

The memory 1304 stores information within the computing device 1300. In some implementations, the memory 1304 is a volatile memory unit or units. In some implementations, the memory 1304 is a non-volatile memory unit or units. The memory 1304 may also be another form of computer-readable medium, such as a magnetic or optical disk.

The storage device 1306 is capable of providing mass storage for the computing device 1300. In some implementations, the storage device 1306 may be or include a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, processor 1302), perform one or more methods, such as those described above. The instructions can also be stored by one or more storage devices such as computer- or machine-readable mediums (for example, the memory 1304, the storage device 1306, or memory on the processor 1302).

The high-speed interface 1308 manages bandwidth-intensive operations for the computing device 1300, while the low-speed interface 1312 manages lower bandwidth-intensive operations. Such allocation of functions is an example only. In some implementations, the high-speed interface 1308 is coupled to the memory 1304, the display 1316 (e.g., through a graphics processor or accelerator), and to the high-speed expansion ports 1310, which may accept various expansion cards (not shown). In the implementation, the low-speed interface 1312 is coupled to the storage device 1306 and the low-speed expansion port 1314. The low-speed expansion port 1314, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1300 may be implemented in a number of different forms, as shown in the figure. For example, it may be implemented as a standard server 1320, or multiple times in a group of such servers. In addition, it may be implemented in a personal computer such as a laptop computer 1322. It may also be implemented as part of a rack server system 1324. Alternatively, components from the computing device 1300 may be combined with other components in a mobile device (not shown), such as a mobile computing device 1350. Each of such devices may include one or more of the computing device 1300 and the mobile computing device 1350, and an entire system may be made up of multiple computing devices communicating with each other.

The mobile computing device 1350 includes a processor 1352, a memory 1364, an input/output device such as a display 1354, a communication interface 1366, and a transceiver 1368, among other components. The mobile computing device 1350 may also be provided with a storage device, such as a micro-drive or other device, to provide additional storage. Each of the processor 1352, the memory 1364, the display 1354, the communication interface 1366, and the transceiver 1368, are interconnected using various buses, and several of the components may be mounted on a common motherboard or in other manners as appropriate.

The processor 1352 can execute instructions within the mobile computing device 1350, including instructions stored in the memory 1364. The processor 1352 may be implemented as a chipset of chips that include separate and multiple analog and digital processors. The processor 1352 may provide, for example, for coordination of the other components of the mobile computing device 1350, such as control of user interfaces, applications run by the mobile computing device 1350, and wireless communication by the mobile computing device 1350.

The processor 1352 may communicate with a user through a control interface 1358 and a display interface 1356 coupled to the display 1354. The display 1354 may be, for example, a TFT (Thin-Film-Transistor Liquid Crystal Display) display or an OLED (Organic Light Emitting Diode) display, or other appropriate display technology. The display interface 1356 may comprise appropriate circuitry for driving the display 1354 to present graphical and other information to a user. The control interface 1358 may receive commands from a user and convert them for submission to the processor 1352. In addition, an external interface 1362 may provide communication with the processor 1352, so as to enable near area communication of the mobile computing device 1350 with other devices. The external interface 1362 may provide, for example, for wired communication in some implementations, or for wireless communication in other implementations, and multiple interfaces may also be used.

The memory 1364 stores information within the mobile computing device 1350. The memory 1364 can be implemented as one or more of a computer-readable medium or media, a volatile memory unit or units, or a non-volatile memory unit or units. An expansion memory 1374 may also be provided and connected to the mobile computing device 1350 through an expansion interface 1372, which may include, for example, a SIMM (Single In Line Memory Module) card interface. The expansion memory 1374 may provide extra storage space for the mobile computing device 1350, or may also store applications or other information for the mobile computing device 1350. Specifically, the expansion memory 1374 may include instructions to carry out or supplement the processes described above, and may include secure information also. Thus, for example, the expansion memory 1374 may be provide as a security module for the mobile computing device 1350, and may be programmed with instructions that permit secure use of the mobile computing device 1350. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier such that the instructions, when executed by one or more processing devices (for example, processor 1352), perform one or more methods, such as those described above. The instructions can also be stored by one or more storage devices, such as one or more computer- or machine-readable mediums (for example, the memory 1364, the expansion memory 1374, or memory on the processor 1352). In some implementations, the instructions can be received in a propagated signal, for example, over the transceiver 1368 or the external interface 1362.

The mobile computing device 1350 may communicate wirelessly through the communication interface 1366, which may include digital signal processing circuitry where necessary. The communication interface 1366 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1368 using a radio frequency. In addition, short-range communication may occur, such as using a Bluetooth, Wi-Fi, or other such transceiver (not shown). In addition, a GPS (Global Positioning System)

receiver module 1370 may provide additional navigation- and location-related wireless data to the mobile computing device 1350, which may be used as appropriate by applications running on the mobile computing device 1350.

The mobile computing device 1350 may also communicate audibly using an audio codec 1360, which may receive spoken information from a user and convert it to usable digital information. The audio codec 1360 may likewise generate audible sound for a user, such as through a speaker, e.g., in a handset of the mobile computing device 1350. Such sound may include sound from voice telephone calls, may include recorded sound (e.g., voice messages, music files, etc.) and may also include sound generated by applications operating on the mobile computing device 1350.

The mobile computing device 1350 may be implemented in a number of different forms, as shown in the figure. For example, it may be implemented as a cellular telephone 1380. It may also be implemented as part of a smart-phone 1382, personal digital assistant, or other similar mobile device.

The term "system" as used in this disclosure may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server is a general-purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

While this disclosure contains many specific implementation details, these should not be construed as limitations on the scope of any invention or of what may be claimed, but rather as descriptions of features that may be specific to particular implementations of particular inventions. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

What is claimed is:

1. A method of training at least one machine-learning network to learn compact representations of radio frequency (RF) signals, the method performed by at least one processor executing instructions stored on at least one computer memory coupled to the at least one processor, the method comprising:

determining a first RF signal to be compressed;

using an encoder machine-learning network to process the first RF signal and generate a compressed signal;

using a decoder machine-learning network to process the compressed signal and generate a second RF signal that represents a reconstruction of the first RF signal;

calculating a measure of distance between the second RF signal and the first RF signal;

obtaining a measure of compression in the compressed signal; and updating at least one of the encoder machine-learning network or the decoder machine-learning network based on (i) the measure of distance between the second RF signal and the first RF signal, and (ii) the measure of compression in the compressed signal, wherein the updating comprises:

determining an objective function that comprises at least: (i) the measure of distance between the second RF signal and the first RF signal, and (ii) the measure of compression in the compressed signal, calculating a rate of change of the objective function relative to variations in at least one of the encoder machine-learning network or the decoder machine-learning network, selecting, based on the calculated rate of change of the objective function, at least one of a first variation for the encoder machine-learning network or a second variation for the decoder machine-learning network, and updating at least one of the encoder machine-learning network or the decoder machine-learning network based on the selected at least one of the first variation or the second variation.

2. The method of claim 1, wherein at least one of the encoding machine-learning network or the decoding machine-learning network comprises at least one of a deep dense neural network (DNN) or a convolutional neural network (CNN) comprising a series of parametric multiplications, additions, and non-linearities.

3. The method of claim 1, wherein the measure of compression in the compressed signal indicates at least one of (i) a relative measure of compression between the first RF signal and the compressed signal or (ii) an absolute measure of complexity in the compressed signal.

4. The method of claim 1, wherein the measure of distance between the second RF signal and the first RF signal comprises a cross-entropy between the second RF signal and the first RF signal.

5. The method of claim 1, wherein using the encoder machine-learning network to process the first RF signal and using the decoder machine-learning network to process the compressed signal comprise:

determining a plurality of basis signals;

using the plurality of basis signals to process the first RF signal by the encoder machine-learning network and generate the compressed signal; and using the plurality of basis signals to process the compressed signal by the decoder machine-learning network and generate the second RF signal.

6. The method of claim 1, wherein updating at least one of the encoder machine-learning network or the decoder machine-learning network comprises at least one of:

updating at least one encoding network weight or network connectivity in one or more layers of the encoder machine-learning network, or updating at least one decoding network weight or network connectivity in one or more layers of the decoder machine-learning network.

7. The method of claim 1, wherein updating at least one of the encoder machine-learning network or the decoder machine-learning network comprises either (i) jointly updating the encoder machine-learning network and the decoder machine-learning network, or (ii) separately updating the encoder machine-learning network and the decoder machine-learning network.

8. The method of claim 1, wherein the encoder machine-learning network and the decoder machine-learning network are jointly trained as an auto-encoder to learn compact representations of RF signals, and wherein the auto-encoder comprises at least one regularization layer that comprises at least one of: weight regularization on network layer weights, activity regularization on network layer activations, or stochastic impairments on network layer activations or network layer weights.

9. The method of claim 1, wherein the first RF signal and the second RF signal comprise at least one of an acoustic signal or an optical signal.

10. A method of deploying at least one machine-learning network that has been trained to learn compact representations of radio frequency (RF) signals, the method performed by at least one processor executing instructions stored on at least one computer memory coupled to the at least one processor, the method comprising:

determining an encoder machine-learning network and a decoder machine-learning network that have been trained to learn compact representations of RF signals;

determining a first RF signal to be compressed;

using the encoder machine-learning network to process the first RF signal and generate a first compressed signal;

obtaining a second compressed signal that comprises the first compressed signal or an alteration thereof; and using the decoder machine-learning network to process the second compressed signal to generate a second RF signal as a reconstruction of the first RF signal, wherein at least one of the encoder machine-learning network or the decoder machine-learning network is trained based on (i) a measure of distance between a training RF signal and a reconstruction of the training RF signal, and (ii) a measure of compression in compressing the training RF signal, wherein the training comprises:

determining an objective function that comprises at least: (i) the measure of distance between the second RF signal and the first RF signal, and (ii) the measure of compression in the compressed signal, calculating a rate of change of the objective function relative to variations in at least one of the encoder machine-learning network or the decoder machine-learning network, selecting, based on the calculated rate of change of the objective function, at least one of a first variation for the encoder machine-learning network or a second variation for the decoder machine-learning network, and updating at least one of the encoder machine-learning network or the decoder machine-learning network based on the selected at least one of the first variation or the second variation.

11. The method of claim 10, further comprising:
storing the first compressed signal in an information storage device;
accessing, from the information storage device, the second compressed signal as a stored version of the first compressed signal; and
inputting the first compressed signal or the second compressed signal into a system for processing a compact representation of the first RF signal.

12. The method of claim 10, further comprising:
transmitting, by a transmitter, the first compressed signal through a communication channel; and
receiving, by a receiver, the second compressed signal as a received version of the first compressed signal having been processed by transmission through the communication channel.

13. The method of claim 10, further comprising:
determining a measure of distance between the second RF signal and the first RF signal; and
based on the measure of distance between the second RF signal and the first RF signal exceeding a threshold, determining an occurrence of an error or an anomaly.

14. The method of claim 10, wherein the encoder machine-learning network and the decoder machine-learning network have been jointly trained as an auto-encoder to learn compact representations of RF signals, and
wherein the auto-encoder comprises at least one regularization layer that comprises at least one of: weight regularization on network layer weights, activity regularization on network layer activations, or stochastic impairments on network layer activations or network layer weights.

15. A system comprising:
at least one processor; and
at least one computer memory coupled to the at least one processor having stored thereon instructions which, when executed by the at least one processor, cause the at least one processor to perform operations comprising:
determining a first RF signal to be compressed;
using an encoder machine-learning network to process the first RF signal and generate a compressed signal;
obtaining a measure of compression in the compressed signal;
using a decoder machine-learning network to process the compressed signal and generate a second RF signal that represents a reconstruction of the first RF signal;
calculating a measure of distance between the second RF signal and the first RF signal; and
updating at least one of the encoder machine-learning network or the decoder machine-learning network based on (i) the measure of distance between the second RF signal and the first RF signal, and (ii) the measure of compression in the compressed signal, wherein the updating comprises:
determining an objective function that comprises at least: (i) the measure of distance between the second RF signal and the first RF signal, and (ii) the measure of compression in the compressed signal,
calculating a rate of change of the objective function relative to variations in at least one of the encoder machine-learning network or the decoder machine-learning network,
selecting, based on the calculated rate of change of the objective function, at least one of a first variation for the encoder machine-learning network or a second variation for the decoder machine-learning network, and
updating at least one of the encoder machine-learning network or the decoder machine-learning network based on the selected at least one of the first variation or the second variation.

16. The system of claim 15, wherein at least one of the encoding machine-learning network or the decoding machine-learning network comprises at least one of a deep dense neural network (DNN) or a convolutional neural network (CNN) comprising a series of parametric multiplications, additions, and non-linearities.

17. The system of claim 15, wherein the measure of compression in the compressed signal indicates at least one of (i) a relative measure of compression between the first RF signal and the compressed signal or (ii) an absolute measure of complexity in the compressed signal.

18. The system of claim 15, wherein the measure of distance between the second RF signal and the first RF signal comprises a cross-entropy between the second RF signal and the first RF signal.

19. The system of claim 15, wherein using the encoder machine-learning network to process the first RF signal and using the decoder machine-learning network to process the compressed signal comprise:
determining a plurality of basis signals;
using the plurality of basis signals to process the first RF signal by the encoder machine-learning network and generate the compressed signal; and
using the plurality of basis signals to process the compressed signal by the decoder machine-learning network and generate the second RF signal.

20. The system of claim 15, wherein updating at least one of the encoder machine-learning network or the decoder machine-learning network comprises at least one of:
updating at least one encoding network weight or network connectivity in one or more layers of the encoder machine-learning network, or
updating at least one decoding network weight or network connectivity in one or more layers of the decoder machine-learning network.

21. The system of claim 15, wherein updating at least one of the encoder machine-learning network or the decoder machine-learning network comprises either (i) jointly updating the encoder machine-learning network and the decoder machine-learning network, or (ii) separately updating the encoder machine-learning network and the decoder machine-learning network.

22. The system of claim 15, wherein the encoder machine-learning network and the decoder machine-learning network are jointly trained as an auto-encoder to learn compact representations of RF signals, and
wherein the auto-encoder comprises at least one regularization layer that comprises at least one of: weight regularization on network layer weights, activity regularization on network layer activations, or stochastic impairments on network layer activations or network layer weights.

23. The system of claim 15, wherein the first RF signal and the second RF signal comprise at least one of an acoustic signal or an optical signal.

24. A system comprising:
at least one processor; and at least one computer memory coupled to the at least one processor having stored thereon instructions which, when executed by the at least one processor, cause the at least one processor to perform operations comprising:
- determining an encoder machine-learning network and a decoder machine-learning network that have been trained to compress RF signals;
- determining a first RF signal to be compressed;
- using the encoder machine-learning network to process the first RF signal and generate a first compressed signal;
- obtaining a second compressed signal that comprises the first compressed signal or an alteration thereof; and
- using the decoder machine-learning network to process the second compressed signal to generate a second RF signal as a reconstruction of the first RF signal, wherein at least one of the encoder machine-learning network or the decoder machine-learning network is trained based on (i) a measure of distance between a training RF signal and a reconstruction of the training RF signal, and (ii) a measure of compression in compressing the training RF signal, wherein the training comprises:
- determining an objective function that comprises at least: (i) the measure of distance between the second RF signal and the first RF signal, and (ii) the measure of compression in the compressed signal,
- calculating a rate of change of the objective function relative to variations in at least one of the encoder machine-learning network or the decoder machine-learning network,
- selecting, based on the calculated rate of change of the objective function, at least one of a first variation for the encoder machine-learning network or a second variation for the decoder machine-learning network, and
- updating at least one of the encoder machine-learning network or the decoder machine-learning network based on the selected at least one of the first variation or the second variation.

25. The system of claim 24, wherein the operations further comprise:
- storing the first compressed signal in an information storage device;
- accessing, from the information storage device, the second compressed signal as a stored version of the first compressed signal; and
- inputting the first compressed signal or the second compressed signal into a system for processing a compact representation of the first RF signal.

26. The system of claim 24, wherein the operations further comprise:
- transmitting, by a transmitter, the first compressed signal through a communication channel; and
- receiving, by a receiver, the second compressed signal as a received version of the first compressed signal having been processed by transmission through the communication channel.

27. The system of claim 24, wherein the operations further comprise:
- determining a measure of distance between the second RF signal and the first RF signal; and
- based on the measure of distance between the second RF signal and the first RF signal exceeding a threshold, determining an occurrence of an error or an anomaly.

28. The system of claim 24, wherein the encoder machine-learning network and the decoder machine-learning network have been jointly trained as an auto-encoder to learn compact representations of RF signals, and
wherein the auto-encoder comprises at least one regularization layer that comprises at least one of: weight regularization on network layer weights, activity regularization on network layer activations, or stochastic impairments on network layer activations or network layer weights.

29. The method of claim 1, wherein the measure of distance between the second RF signal and the first RF signal comprises a geometric distance metric between the second RF signal and the first RF signal.

30. The system of claim 15, wherein the measure of distance between the second RF signal and the first RF signal comprises a geometric distance metric between the second RF signal and the first RF signal.

31. The method of claim 1, wherein obtaining the measure of compression in the compressed signal comprises one of:
calculating the measure of compression in the compressed signal, or accessing a known measure of compression used to generate the compressed signal.

32. The system of claim 15, wherein obtaining the measure of compression in the compressed signal comprises one of:
calculating the measure of compression in the compressed signal, or
accessing a known measure of compression used to generate the compressed signal.

* * * * *